INVENTOR
LOUIS M. POTTS, DECEASED
MARTHA W. C. POTTS, EXECUTRIX
BY Emery Robinson
ATTORNEY June 19, 1951 L. M. POTTS 2,557,392

COMBINED TELEPHONE AND TELEGRAPH SYSTEM

Filed March 17, 1947 15 Sheets-Sheet 2

INVENTOR
LOUIS M. POTTS, DECEASED
MARTHA W. C. POTTS, EXECUTRIX

BY Emery Robinson
ATTORNEY

COMBINED TELEPHONE AND TELEGRAPH SYSTEM

Filed March 17, 1947 15 Sheets-Sheet 3

INVENTOR
LOUIS M. POTTS, DECEASED
MARTHA W. C. POTTS, EXECUTRIX
BY Emery Robinson
ATTORNEY

COMBINED TELEPHONE AND TELEGRAPH SYSTEM

Filed March 17, 1947

15 Sheets-Sheet 4

FIG. 15 (DISTRICT SELECTOR), FIG. 7

INVENTOR
LOUIS M. POTTS, DECEASED
MARTHA W. C. POTTS, EXECUTRIX
BY Emery Robinson
ATTORNEY June 19, 1951 L. M. POTTS 2,557,392

COMBINED TELEPHONE AND TELEGRAPH SYSTEM

Filed March 17, 1947 15 Sheets-Sheet 5

INVENTOR
LOUIS M. POTTS, DECEASED
MARTHA W. C. POTTS, EXECUTRIX
BY Emery Robinson
ATTORNEY June 19, 1951 L. M. POTTS 2,557,392

COMBINED TELEPHONE AND TELEGRAPH SYSTEM

Filed March 17, 1947 15 Sheets-Sheet 6

| | START | IDLE | +1 | -1 | +2 | -2 | +3 | -3 | +4 | -4 | +5 | -5 | +6 | IDLE | IDLE | IDLE |
|---|---|---|---|---|---|---|---|---|---|---|---|---|---|---|---|---|
| A | - | O | + | - | + | - | + | - | + | - | O | O | O | O | O | O |
| B | - | O | + | - | + | - | + | - | + | O | O | O | O | O | O | O |
| C | - | O | + | - | + | O | + | O | + | O | O | O | O | O | O | O |
| D | - | O | + | - | + | - | + | - | + | - | + | - | O | O | O | O |
| E | - | O | + | - | + | - | + | O | + | O | O | O | O | O | O | O |
| F | - | O | + | O | + | O | + | O | + | O | O | O | O | O | O | O |
| G | - | O | + | - | + | - | + | - | O | - | O | O | O | O | O | O |
| H | - | O | + | - | + | - | + | - | O | O | O | O | O | O | O | O |
| I | - | O | + | - | + | O | + | O | O | O | O | O | O | O | O | O |
| J | - | O | + | - | + | - | + | - | O | - | O | - | O | O | O | O |
| K | - | O | + | - | + | - | + | O | O | O | O | O | O | O | O | O |
| L | - | O | + | O | + | O | + | O | O | O | O | O | O | O | O | O |
| M | - | O | + | - | O | - | O | - | O | - | O | O | O | O | O | O |
| N | - | O | + | - | O | - | O | - | O | O | O | O | O | O | O | O |
| O | - | O | + | - | O | O | O | O | O | O | O | O | O | O | O | O |
| P | - | O | + | - | O | - | O | - | O | - | O | - | O | O | O | O |
| Q | - | O | + | - | O | - | O | O | O | O | O | O | O | O | O | O |
| R | - | O | + | O | O | O | O | O | O | O | O | O | O | O | O | O |
| S | - | O | + | - | + | - | + | - | + | - | + | O | O | O | O | O |
| T | - | O | + | - | + | - | + | - | + | O | + | O | O | O | O | O |
| U | - | O | + | - | + | O | + | O | + | O | + | O | O | O | O | O |
| V | - | O | + | - | + | - | + | - | + | - | + | - | O | O | O | O |
| W | - | O | + | - | + | - | + | O | + | O | + | O | O | O | O | O |
| X | - | O | + | O | + | O | + | O | + | O | + | O | O | O | O | O |
| Y | - | O | + | - | + | - | O | - | O | - | O | O | O | O | O | O |
| Z | - | O | + | - | + | - | O | - | O | O | O | O | O | O | O | O |
| 1 | - | O | + | - | + | O | O | O | O | O | O | O | O | O | O | O |
| 2 | - | O | + | - | + | - | O | - | O | - | O | - | O | O | O | O |
| 3 | - | O | + | - | + | - | O | O | O | O | O | O | O | O | O | O |
| 4 | - | O | + | O | + | O | O | O | O | O | O | O | O | O | O | O |
| 5 | - | O | + | - | + | - | O | - | O | - | O | O | O | O | O | O |
| 6 | - | O | + | - | + | - | + | - | + | O | + | O | + | O | O | O |
| 7 | - | O | + | - | + | O | + | O | + | O | + | O | + | O | O | O |
| 8 | - | O | + | - | + | - | + | - | + | - | + | - | + | O | O | O |
| 9 | - | O | + | - | + | - | + | O | + | O | + | O | + | O | O | O |
| 0 | - | O | + | O | + | O | + | O | + | O | + | O | + | O | O | O |
| SP | - | O | O | O | O | O | O | O | O | O | O | O | O | O | O | O |

FIG. 10

| | START | IDLE | +1 | -1 | +2 | -2 | +3 | -3 | +4 | -4 | +5 | -5 | +6 | IDLE | IDLE | IDLE |
|---|---|---|---|---|---|---|---|---|---|---|---|---|---|---|---|---|
| | | | + | + | + | + | + | + | + | + | O | O | O | O | O | O |
| | | | + | + | + | + | + | + | + | O | O | O | O | O | O | O |
| | | | + | + | + | O | + | O | + | O | O | O | O | O | O | O |
| | | | + | + | + | + | + | + | + | + | + | + | O | O | O | O |
| | | | + | O | + | O | + | O | + | O | O | O | O | O | O | O |
| | | | + | O | + | O | + | O | + | O | O | O | O | O | O | O |
| | | | + | + | + | + | + | + | O | O | O | O | O | O | O | O |
| | | | + | + | + | + | + | + | O | O | O | O | O | O | O | O |
| | | | + | + | + | O | + | O | O | O | O | O | O | O | O | O |
| | | | + | + | + | + | + | + | O | + | O | + | O | O | O | O |
| | | | + | + | + | + | O | O | O | O | O | O | O | O | O | O |
| | | | + | O | + | O | + | O | O | O | O | O | O | O | O | O |
| | | | + | + | O | + | O | + | O | + | O | O | O | O | O | O |
| | | | + | + | O | + | O | + | O | O | O | O | O | O | O | O |
| | | | + | + | O | O | O | O | O | O | O | O | O | O | O | O |
| | | | + | + | O | + | O | + | O | + | O | + | O | O | O | O |
| | | | + | + | O | + | O | O | O | O | O | O | O | O | O | O |
| | | | + | O | O | O | O | O | O | O | O | O | O | O | O | O |
| | | | + | + | + | + | + | + | + | + | + | O | O | O | O | O |
| | | | + | + | + | + | + | + | + | O | + | O | O | O | O | O |
| | | | + | + | + | O | + | O | + | O | + | O | O | O | O | O |
| | | | + | + | + | + | + | + | + | + | + | + | O | O | O | O |
| | | | + | + | + | + | + | O | + | O | + | O | O | O | O | O |
| | | | + | O | + | O | + | O | + | O | + | O | O | O | O | O |
| | | | + | + | + | + | O | + | O | + | O | O | O | O | O | O |
| | | | + | + | + | + | O | + | O | O | O | O | O | O | O | O |
| | | | + | + | + | O | O | O | O | O | O | O | O | O | O | O |
| | | | + | + | + | + | O | + | O | + | O | + | O | O | O | O |
| | | | + | + | + | + | O | O | O | O | O | O | O | O | O | O |
| | | | + | O | + | O | O | O | O | O | O | O | O | O | O | O |
| | | | + | + | + | + | O | + | O | + | O | O | O | O | O | O |
| | | | + | + | + | + | + | + | + | O | + | O | + | O | O | O |
| | | | + | + | + | O | + | O | + | O | + | O | + | O | O | O |
| | | | + | + | + | + | + | + | + | + | + | + | + | O | O | O |
| | | | + | + | + | + | + | O | + | O | + | O | + | O | O | O |
| | | | + | O | + | O | + | O | + | O | + | O | + | O | O | O |
| | | | O | O | O | O | O | O | O | O | O | O | O | O | O | O |

FIG. 10A

INVENTOR
LOUIS M. POTTS, DECEASED
MARTHA W. C. POTTS, EXECUTRIX
BY Emery Robinson
ATTORNEY FIG. 11 (SUBSCRIBER'S STATION)
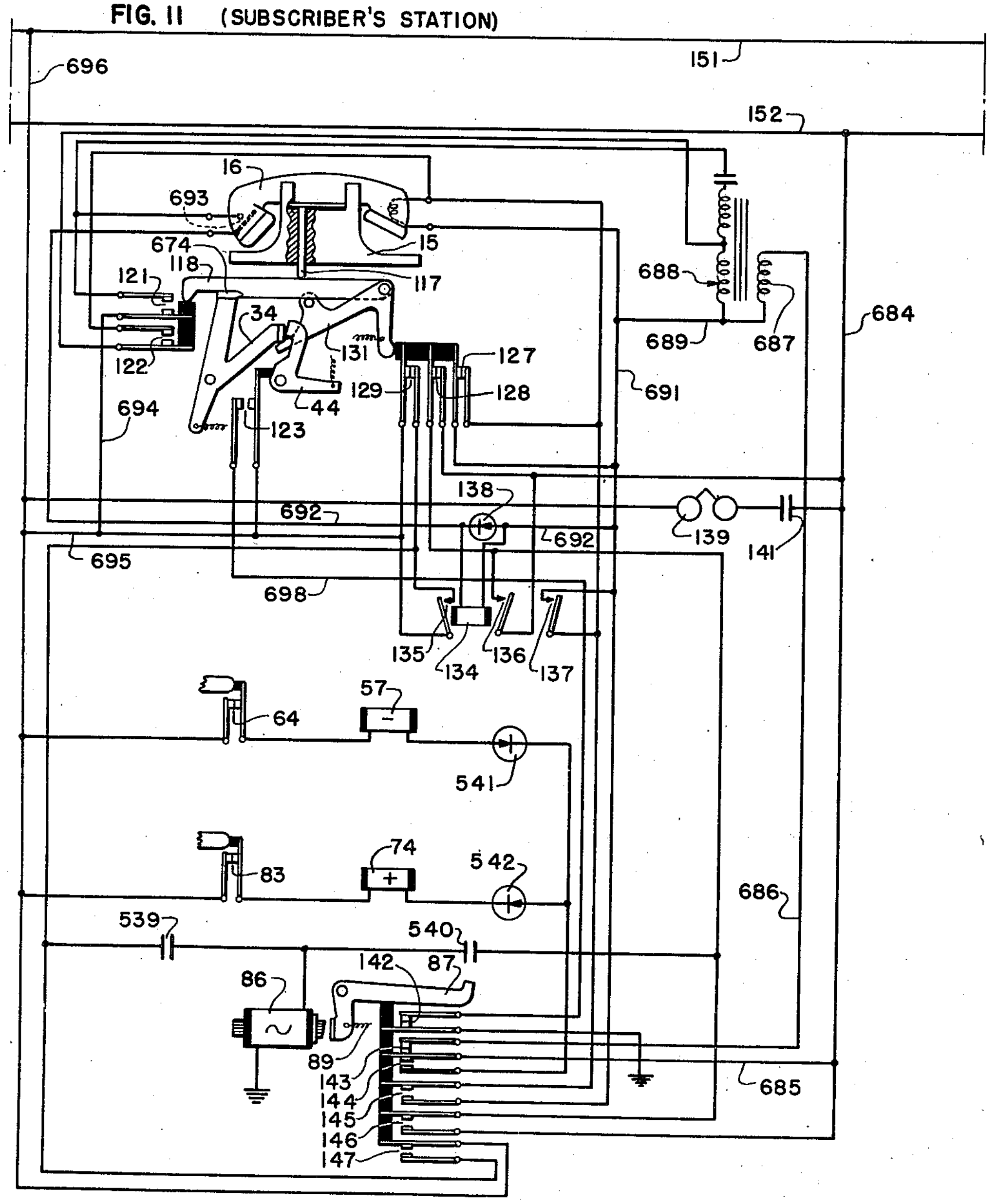
INVENTOR
LOUIS M. POTTS, DECEASED
MARTHA W. C. POTTS, EXECUTRIX
BY Emery Robinson
ATTORNEY.

COMBINED TELEPHONE AND TELEGRAPH SYSTEM

Filed March 17, 1947 15 Sheets-Sheet 8

FIG. 12 (CALL REGISTER)

| FIG. 11 | FIG. 12 | FIG. 13 |
|---|---|---|

INVENTOR
LOUIS M. POTTS, DECEASED
MARTHA W. C. POTTS, EXECUTRIX
BY Emery Robinson
ATTORNEY.

June 19, 1951 L. M. POTTS 2,557,392

COMBINED TELEPHONE AND TELEGRAPH SYSTEM

Filed March 17, 1947 15 Sheets-Sheet 9

(CALL REGISTER)

INVENTOR
LOUIS M. POTTS, DECEASED
MARTHA W. C. POTTS, EXECUTRIX
BY Emery Robinson
ATTORNEY.

FIG. 16 (INCOMING SELECTOR)
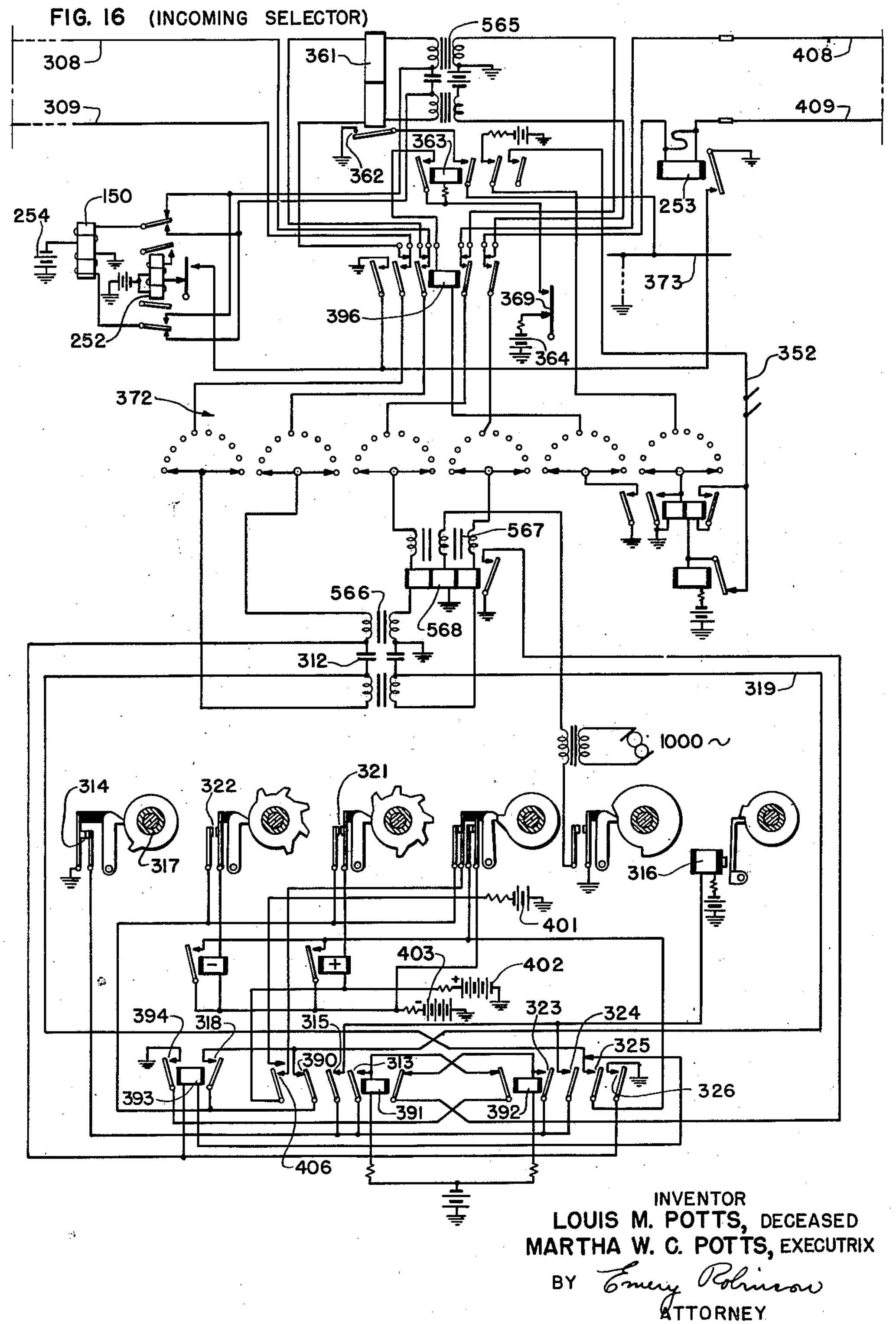
INVENTOR
LOUIS M. POTTS, DECEASED
MARTHA W. C. POTTS, EXECUTRIX
BY Emery Robinson
ATTORNEY

COMBINED TELEPHONE AND TELEGRAPH SYSTEM

Filed March 17, 1947 15 Sheets-Sheet 11

INVENTOR
LOUIS M. POTTS, DECEASED
MARTHA W. C. POTTS, EXECUTRIX
BY Emery Robinson
ATTORNEY June 19, 1951 L. M. POTTS 2,557,392
COMBINED TELEPHONE AND TELEGRAPH SYSTEM
Filed March 17, 1947 15 Sheets-Sheet 12
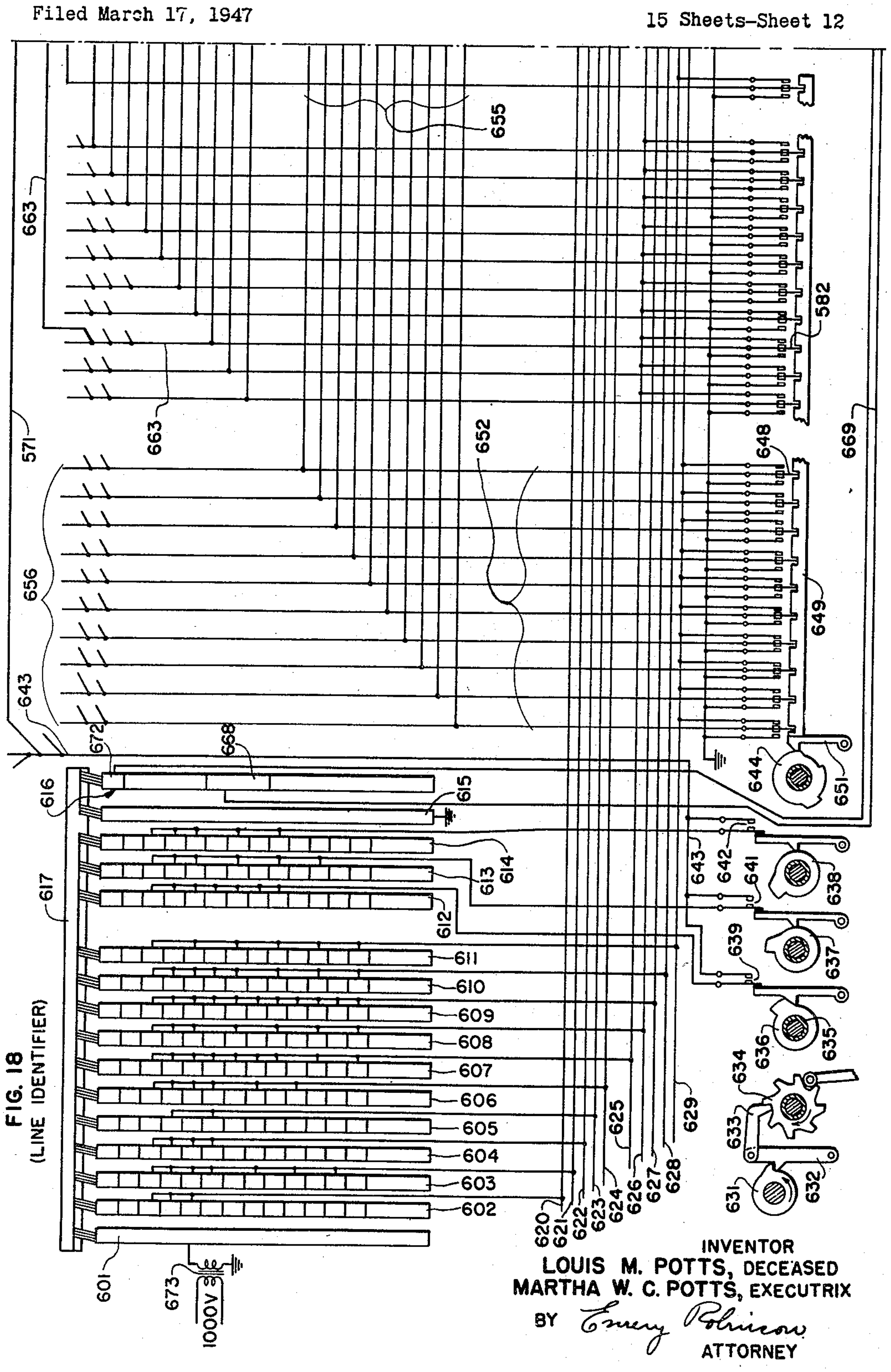
FIG. 18 (LINE IDENTIFIER)
INVENTOR
LOUIS M. POTTS, DECEASED
MARTHA W. C. POTTS, EXECUTRIX
BY Emery Robinson
ATTORNEY

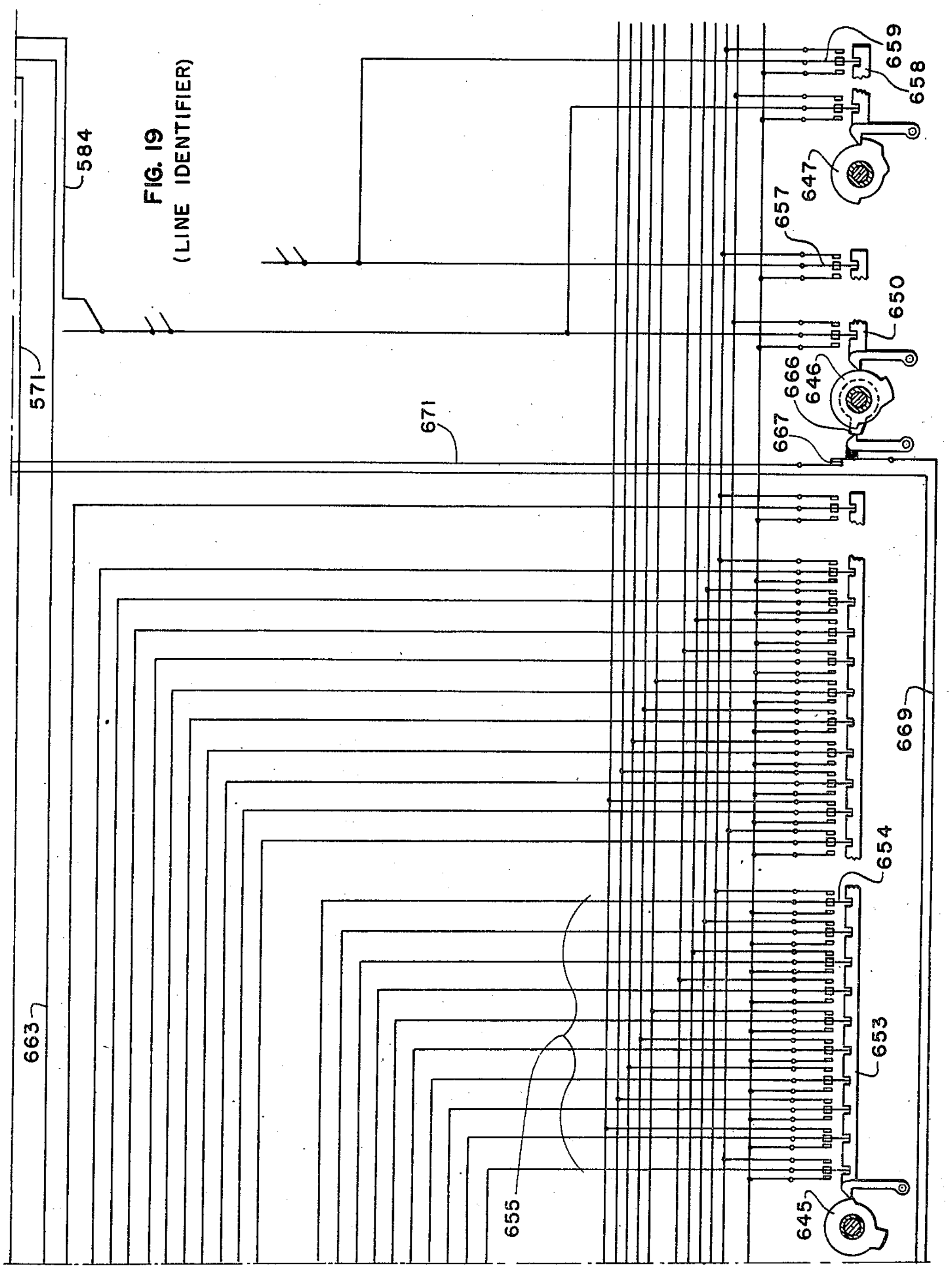
FIG. 19 (LINE IDENTIFIER)
INVENTOR
LOUIS M. POTTS, DECEASED
MARTHA W. C. POTTS, EXECUTRIX
BY Emery Robinson
ATTORNEY June 19, 1951 L. M. POTTS 2,557,392

COMBINED TELEPHONE AND TELEGRAPH SYSTEM

Filed March 17, 1947 15 Sheets-Sheet 14

INVENTOR
LOUIS M. POTTS, DECEASED
MARTHA W. C. POTTS, EXECUTRIX
BY Emery Robinson
ATTORNEY (LONG DISTANCE LINK)

INVENTOR
LOUIS M. POTTS, DECEASED
MARTHA W. C. POTTS, EXECUTRIX
BY Emery Robinson
ATTORNEY Patented June 19, 1951 2,557,392

UNITED STATES PATENT OFFICE 2,557,392

COMBINED TELEPHONE AND TELEGRAPH SYSTEM

Louis M. Potts, deceased, late of Evanston, Ill., by Martha W. C. Potts, executrix, Evanston, Ill., assignor to Teletype Corporation, Chicago, Ill., a corporation of Delaware Application March 17, 1947, Serial No. 735,186

7 Claims. (Cl. 178—2)

This invention relates to communication systems and more particularly to systems combining telephone and telegraph operations.

A primary object of the invention is to provide a combined telephone and telegraph system wherein the calling subscriber may communicate with an unattended subscriber set and leave a printed record of his message.

According to the present invention a communication system is provided in which each telephone subscriber, in place of the telephone subset including a calling dial, has a subset in which the base includes a telegraph keyboard transmitter and a type character recorder. The telegraph keyboard is used for setting up the connections for telephone service as well as for telegraph service and thus replaces the dials. It also provides a leave word service. The subscriber automatically produces a printed record of all outgoing calls including exchange designation and subscriber's number. The system according to the invention also includes a line identifier which automatically records on the calling station printer, the station designation and subscriber's number of the connected station before a message can be transmitted.

More specifically, the subscriber's unit of the present invention is intended to replace the present telephone subscriber's unit and comprises a base which contains the call bell, induction coil, and telegraph transmitting and receiving apparatus, and has a cradle to carry the handset, which includes the telephone transmitter and receiver. In place of the dial there is provided a keyboard which serves the purpose of the dial for controlling the switchboard at the central station to set up a circuit to the called subscriber for telephone or telegraph communication. For telephone communication the procedure is the same as at the present time except that when the dial tone is received, the keyboard is operated in place of the dial.

At the central station, the apparatus of the telephone exchange may be the same as at present, with two exceptions: First, to the register circuit there is added a device which registers the called station designation in a telegraph code and translates the telegraph code into the regular decimal telephone code and registers it in that code, which registration controls the switchboard in the usual manner. Secondly, when telegraph service is desired, there are added to the link circuits, units which in response to the operation of the keyboard at either connected subscriber's station send to both subscribers' stations positive and negative impulses, the number of which is determined by the key depressed.

Since most communications are telephonic, and the telegraph apparatus will be required only occasionally, the circuits of the system according to the present invention provide only the number of telegraph repeaters required by the telegraph traffic itself. However, to provide the greatest flexibility, the link circuits are provided with finding circuits so that a telegraph repeater can be attached instantly to any circuit when required. If this flexibility is sacrificed and the telegraph repeater is added only in response to a special call before connection is made, the modified circuits may be simpler or at least fewer, but the same in principle as hereinafter shown and described. When the telephone communication is used, the answering party is usually readily identified, but in unattended or leave word telegraph service, means must be provided to identify the connected station before the telegram is sent. Accordingly, a line identifier is included in the system according to the present invention.

In the embodiment hereinafter described, the transmitter is of the revertive type. The only signal actually transmitted from the subscriber's station is a start impulse which acts to start a transmitter at the central station, which attempts on each cycle of operation to transmit alternately plus and minus impulses until a total of six positive and five negative impulses have been conditionally permitted. After the number of each kind of impulse corresponding to the key depressed has been transmitted, the circuit is opened at the substation for each kind of impulse so that, at the following attempts, the impulses of that polarity will not be transmitted. No timing of the impulses is required at the subscriber's station and no speed control, except only that the impulses must be long enough and strong enough to operate the magnet and the mechanism with certainty. When two subscribers are connected, like code impulses are transmitted to both stations simultaneously. Whichever line first depresses a key seizes control and determines the signals transmitted. Each transmitter transmits signals in both directions which may be of a different character in the two directions to meet different circuit conditions, but similar to one another in the code arrangement of the elementary impulses. In the register circuit the repeated signals are used for registering the called station designation. In the communication link circuit the second set of signals is used to operate the recorder at the connected distant station.

The system according to the present invention may be utilized in various ways. For example, the keyboard may be used for calling purposes like a telephone dial so that in telephonic conversation the procedure is exactly the same as at present. If the called party fails to answer, the calling party may operate the keyboard, get a record of exchange and number of the connected station, and leave word as the printer at the called station is always controllable from the keyboard at the calling station by merely pressing the space bar. In telegraphic communication the keyboard may be used for calling in the manner of a telpehone dial and telegraph signaling may take place in either or both directions when the party answers. The record on the tape serves as a complete record of all the calls made, both telephonic and telegraphic. When a station is idle, the conditions are substantially the same as in the present substation set. At all times, except when keys are depressed, all parts of the telegraph apparatus are at rest and no current flows through any of the substation telegraph apparatus.

In the usual impulse operated devices, impulses of current are alternated with no current intervals. In this apparatus, the intervals of no positive current are occupied by intervals of negative current. By this method, the equivalent frequency of the signals is one-half that of the usual method for the same total number of steps. The telephone call dial impulsing method uses intervals of current and no current. The maximum speed at which a subscriber's dial may be operated for a seven unit station destination requires a minimum of about seven seconds and usually more. At the very moderate frequency of sixteen cycles the same call with this device will take three and one-half seconds. At sixteen cycles the telegraph speed is twenty words per minute. Double this speed or more than double seems entirely feasible. The transmitter shown here is one in which a maximum of six positive and five negative impulses are used, making a total of eleven impulses. The total number of intervals assigned to a character signal is sixteen intervals so that the idle intervals provide for printing and returning the parts to normal after printing, ready for the next signal. The start interval also provides some additional return time.

For a more complete understanding of the present invention reference is had to the following description taken in conjunction with the accompanying drawings wherein:

Figs. 10 and 10A illustrate the codes used in the practice of the present invention;

Fig. 11 is a wiring diagram of a subscriber's substation;

Figs. 12 and 13 show diagrammatically the wiring of a call register;

Fig. 14 illustrates the manner in which Figs. 11, 12, and 13 are placed together to show how a call is registered;

Fig. 15 is a circuit diagram of the district selector;

Fig. 16 is a circuit diagram of the incoming selector;

Figs. 18 and 19 represent the circuit diagram of a master identification signal generator;

Figure 1:
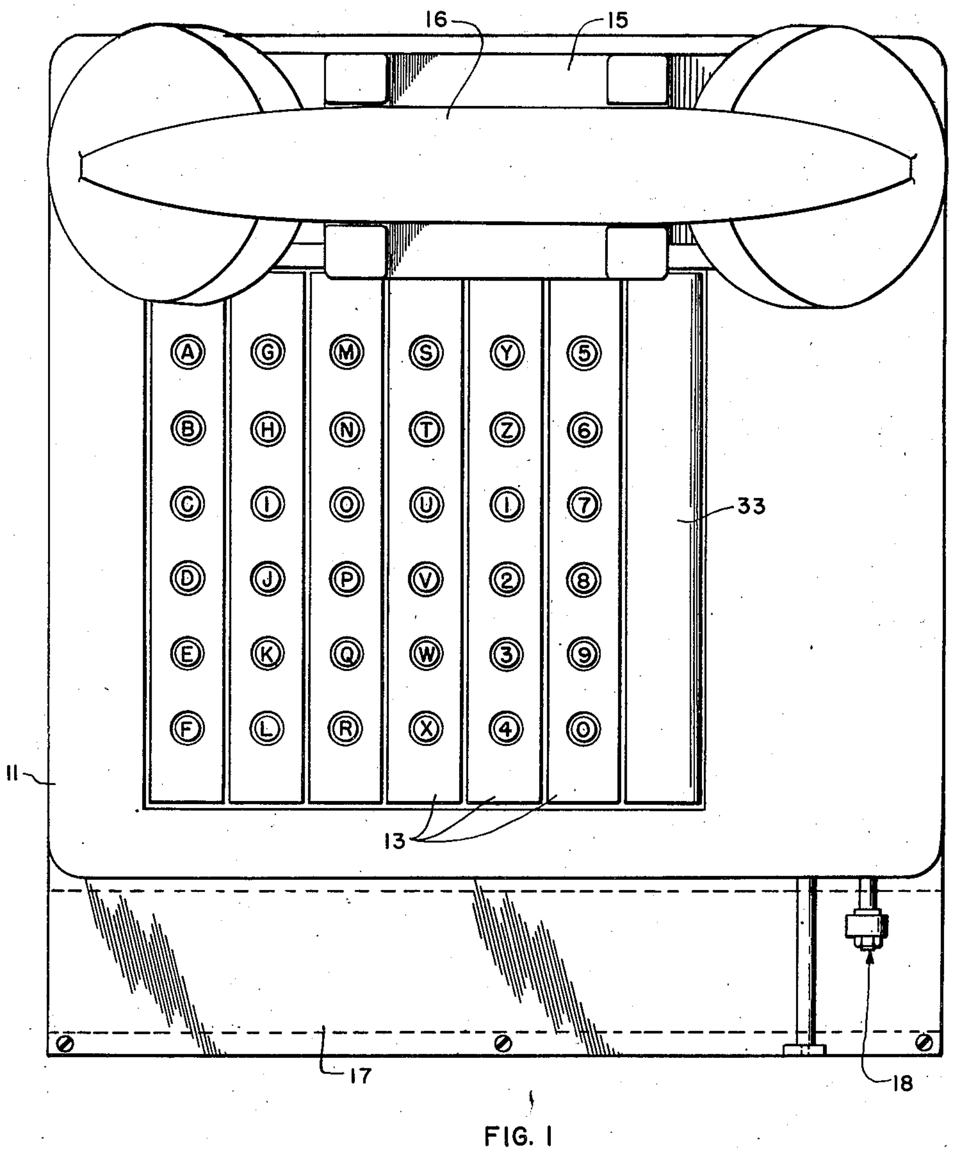
Fig. 1 is a top view of the combined unit according to the present invention showing the keyboard and telephone units.

Having reference to Figs. 1 to 4, inclusive, the combined unit according to the present invention comprises a housing 11 mounted on a base plate 12. Substantially level with the top surface of the housing 11 is arranged a plurality of key bars 13. Protruding through the key bars 13 and substantially level with the top surface thereof are a plurality of key tops 14. Positioned to the rear of the key bars 13 and key tops 14 on the housing 11 is a telephone cradle 15 (Fig. 1) adapted to support a telephone unit 16 of well known design.

Figures 2, 3:
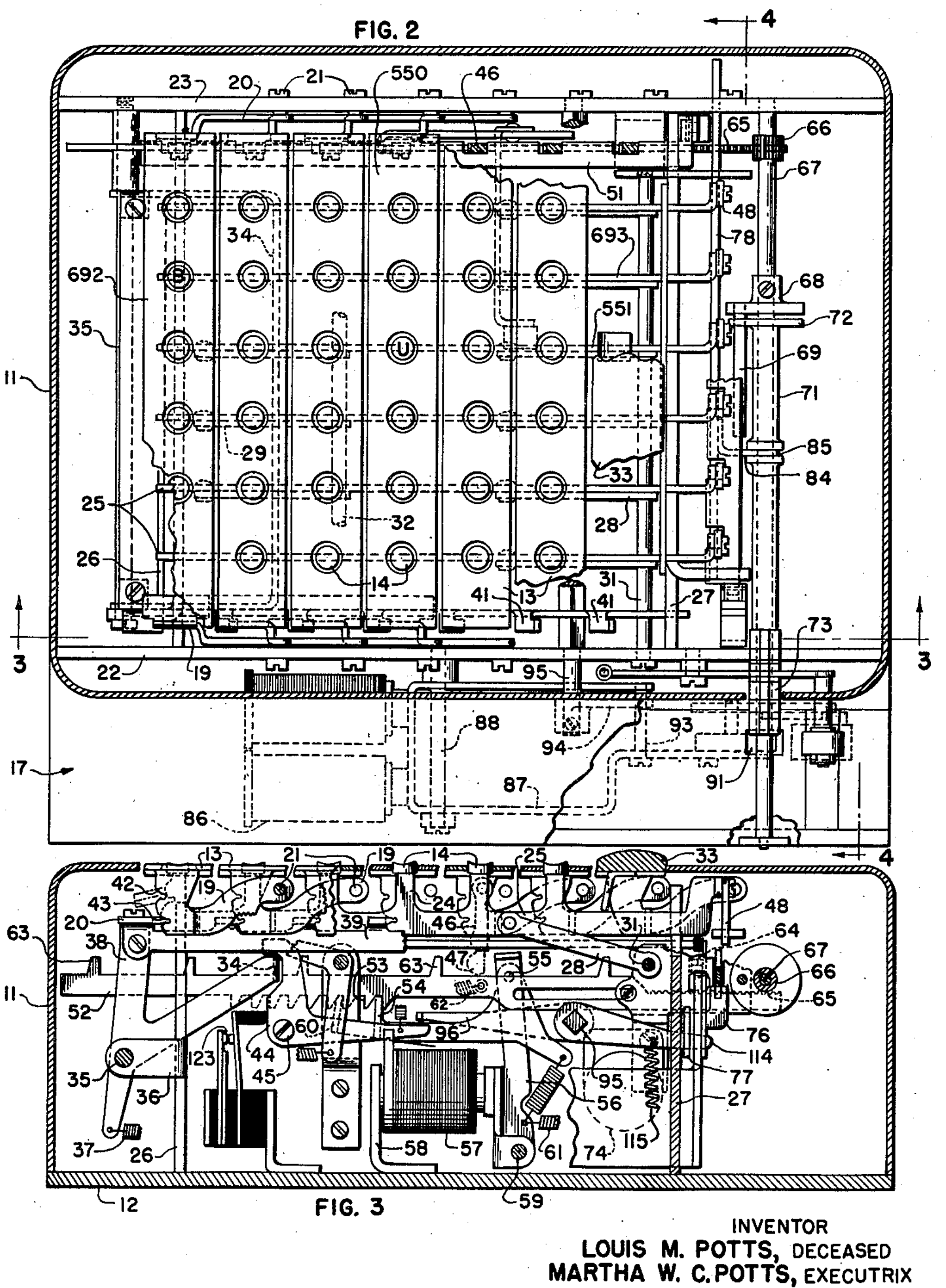
Fig. 2 is a plan view, partly in section, of the keyboard arrangement according to the invention.
Fig. 3 is a cross sectional view taken substantially on line 3—3 of Fig. 2.
Figure 4:
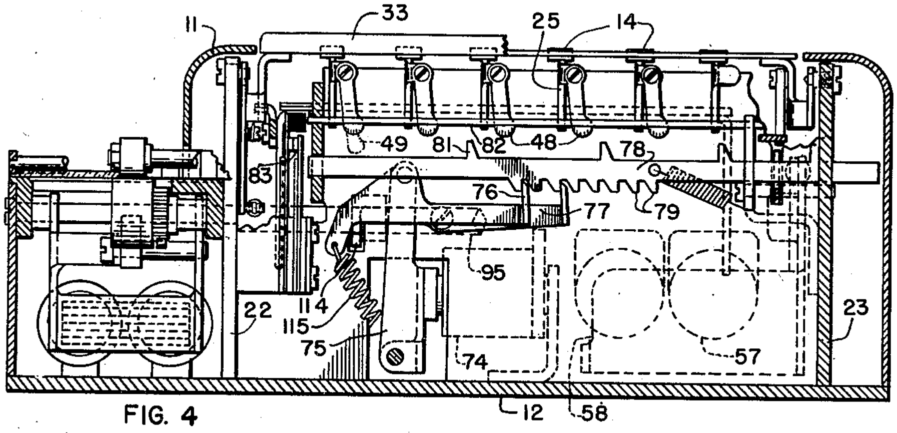
Fig. 4 is a sectional view taken substantially on line 4—4 of Fig. 2.

At the front of the unit (Fig. 1) is a portion 17 of lower level whereon the tape, after being printed upon by the type wheel printing mechanism 18, is adapted to be moved across. Referring particularly to Figs. 2, 3, and 4, the keyboard shown is of the coördinate type and comprises six horizontal bars 13 mounted on end brackets 19 pivotally supported on pivots 21.

Pivots 21 are carried on front and rear plates 22 and 23 supported vertically on the base plate 12. Bars 13 each have therein six equally spaced openings through which project the key tops 14. Key tops 14 are adapted to fit on vertical projections 24 of a series of bars 25 arranged transversely of bars 13. Bars 24 are slidably guided in suitable comb slots in side plates 26 and 27 mounted vertically on base plate 12, and each bar 24 is supported in a parallel motion manner on a pair of links 28 and 29 carried pivotally on pivot shafts 31 and 32, respectively. When a finger is placed on one of the key tops 14, some part of the finger will project over the edge of the opening through which the key tops protrude, and when the finger is moved downwardly, one of the bars 13 will swing around its pivot 21, and one of the bars 25 will also move downwardly with parallel motion. It will be noted that suitable springs are provided for normally holding both sets of bars 13 and 25 in the positions shown in Figs. 2 and 3. It will be noted also that there are thirty-six combinations of two bars which may be depressed so that the keyboard will serve for the transmission of thirty-six character signals. There is also provided an extra bar 33 which, as explained in connection with the wiring diagram hereinafter, when depressed transmits only a start impulse and causes the record material to advance without effecting printing.

An alphabetical arrangement of characters is shown on the keyboard (Fig. 1) as following established telephone dial practice and best adapted to the use of the general public.

Figs. 10 and 10A illustrate the code employed in the practice of the present invention. Fig. 10 shows the signals used on the links which reach to the subscriber. Fig. 10A shows the signals used on intermediate links. In the case of the line identifier, the signals are as shown in Fig. 10A but the positive (plus) signs indicate blocks of 1,000 cycle current, and zero (0) indicates no current.

In the start interval, a minus current is indicated. This, however, may not be a start impulse but may merely indicate the battery for telephone communication. In the case of terminal links, the start impulse is an unbalanced condition of the line associated with the transmitting station. On the link associated with the called station there is no true start impulse, but the alternating current print impulse conditions the printer for receiving and might be considered as replacing the start impulse. The so called start impulse is shown as unit length but it may be shorter as it can be terminated as soon as the transmitter at the central station starts; or, in fact, as soon as the supervisory relay locks up.

Positioned below the bars 25 is a universal bail 34 which is of a U-shape conformation and is adapted to be mounted pivotally on a shaft 35 supported or journaled in bearing bracket 36 integral with the side plate 26. Bail 34 is normally biased in a counterclockwise direction about its pivot shaft 35 by a spring 37. Integral with the bail 34 and extending vertically therefrom is an arm 38 to the extremity of which is pivotally connected a locking bar 39. Bar 39 is slidably mounted in a slot in side plate 27. Bar 39 is provided with a series of sidewardly projecting locking elements 41 (Fig. 2) which are adapted to cooperate with notches 42 provided therefor in each of the adjacent arms 19. The locking bail 39 is also adapted to cooperate with a corresponding series of notches 43 of bar 25 so that when a key is depressed the arm 38 of bail 34 is rocked in a clockwise direction, and a pawl or locking element 44 pivoted at 45 will rock counterclockwise locking the member 34 in its clockwise position, and in turn lock each of the plates 13 and bars 25 in their depressed position. The bars which have not been depressed are also locked in their normal position so that no other key can be depressed until the lock is released; that is, until the signal corresponding to the depressed bars has been transmitted.

Attached to each of the plates 13 is a pivoted depending finger 46, which will assume the dot and dash line position 47 (Fig. 3) when the key to which it is pivoted is depressed. Likewise, each of the slide bars 25 also carries a similar pivoted depending finger 48 which will occupy the dotted position 49 (Fig. 4) when the corresponding bar 25 is depressed. Fingers 46 pass through notches in a bar 51 (Fig. 2) which is slidably carried in the side plates 26 and 27. In the plane of the depending members 46 there is positioned a slidable bar 52 which has on its lower edge a plurality of equally spaced teeth 53 adapted to be engaged by a pawl member 54 which is pivotally mounted at 55 on the armature 56 of a stepping magnet 57 carried on a bracket 58 mounted on the base plate 12. In the drawings (Fig. 3) the armature 56 is shown attracted by the magnet 57, but when the machine according to the present invention is not in operation, the magnet 57 will be de-energized. When the magnet 57 is energized, the armature 56 moves to its attracted or counterclockwise position about its pivot 59, and the pawl 54 will engage the first tooth 53. When the magnet 57 is de-energized, a spring 61 will retract the armature and advance the bar 52 rightwardly one step against the tension of its individual spring 62 (one end of which is attached to bar 52, as shown, and the other end is attached to a spring post, not shown), and a holding pawl 60 will function to hold the bar 52 in its advanced position when the magnet is again energized for the next step. On the upper edge of the bar 52 is a series of projections 63 which are in the plane of the fingers 46. Thus, as the bar 52 is moved along rightwardly, step by step, some one of the projections 63 will eventually engage one of the depending fingers 46, which will be moved to the right along with the bar 52, and in so doing the bar 51 will also be moved to the right, and a contact 64 will interrupt the stepping impulses, as will hereinafter appear in connection with the description of the electrical circuit. The projections 63 are so spaced on the upper edge of bar 52 that for one of the bars 13 the bar 52 will advance only one step, and for another bar 13 the bar 52 will advance six steps, and for other bars 13 the movement of 52 will be in intermediate amounts before the bar 51 is moved.

The right hand end of the bar 52 (as viewed in Fig. 3) is provided with a rack portion 65 which meshes with a pinion 66 which is rigidly mounted on a shaft 67. Fixed to the shaft 67 is a collar 68 (Fig. 2) to the flange of which is fixed a pin 69 extending in a direction axially of the shaft 67. Slidably carried on shaft 67 is a sleeve 71 which is provided at one end thereof with a flange 72 through a hole in which the pin 69 extends. On the opposite end of sleeve 71 is formed a type wheel 73 having six rows of type faces thereon, each row having six type faces engraved thereon. According to the motion of the bar 52 the type wheel will be positioned selectively in one of its six angular positions according to which one of the bars 13 has been depressed.

A stepping magnet 74 (Fig. 4) is provided with an armature 75 which carries a stepping pawl 76. There is also provided a locking pawl 77 and a bar 78 which carries on its lower edge a series of teeth 79, similar to the parts already described in connection with the magnet 57. The bar 78 is moved in a similar manner by magnet 74 and the lugs 81 cooperate with the depending levers 48 and move a bar 82 to the left (as viewed in Fig. 4) to open a contact 83 after the magnet 74 has received a number of impulses corresponding to the one of the bars 25 which has been depressed. Attached to the bar 78 is a projection 84 (Fig. 2) which fits into a groove 85 in the sleeve 71 so that as the bar 78 is advanced step by step through the action of pawl 76 and teeth 79 on bar 78, the type wheel 73 is advanced in a similar manner to bring the proper row of type into printing position.

Mounted in the forward portion 17 of the printing unit is a print magnet 86. Magnet 86 is an alternating current magnet and preferably has a laminated core and shaded poles. At twenty words per minute, magnet 86 will receive an impulse about three-tenths of a second long, and at forty words an impulse of three-twentieths of a second, so that it need not be fast except for a very short throw to operate the contacts. Commercial sixty cycle current is suitable.

Magnet 86 is normally energized, and following the receipt of the positive and negative impulses for each signal, the magnet 86 is de-energized and a print hammer 87 is permited to rotate counterclockwise about its pivot point 88 under the tension of a printing spring 89. The hammer head 91 then presses the tape 92 against the selected type face of the type wheel 73. Instead of providing an ink ribbon or ink wheel, it is proposed that a one time carbon ribbon will be fed in with the tape although either ribbon or ink wheel may be used if desired.

When the print hammer 87 approaches the end of its operating or printing stroke, a pin 93 thereon engages a lever 94 mounted on a shaft 95. Having reference to Fig. 3, an arm 96 is fixed to the shaft 95 so that as the shaft 95 rotates counterclockwise, the end of the arm or lever 96 functions to rotate the latching bell crank 44 clockwise thereby releasing the locking lever 34, and in turn unlocking the lever blade 43 to unlock the key levers 19, so that the plates 13 and the bars 25, which have been depressed, return to their normal position.

Figure 5:
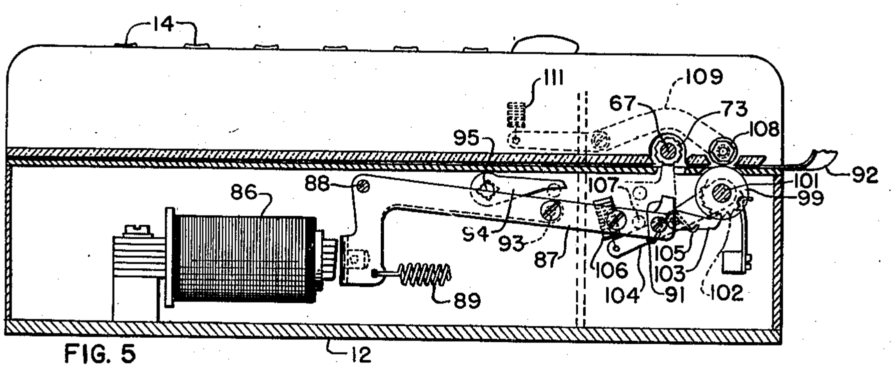
Fig. 5 is a front elevation of the unit according to the present invention showing the print hammer arrangement.
Figure 6:
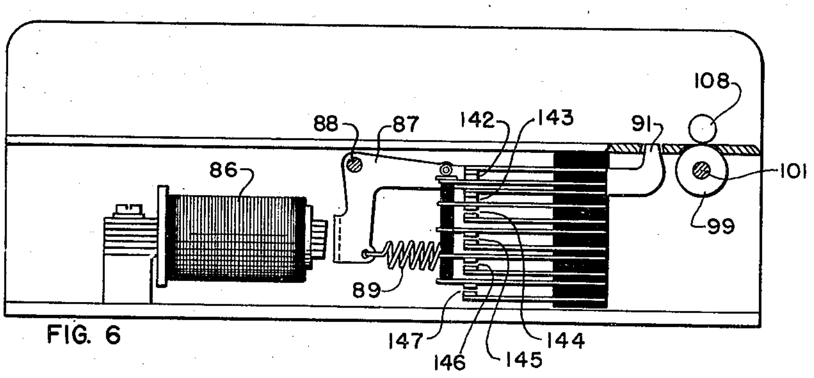
Fig. 6 is a front elevational view showing certain of the contact mechanisms.

A feed roll 99 is rotatably carried on a shaft 101 appropriately journaled in the unit adjacent to the type wheel 73 (as viewed in Fig. 5). Fixed to the feed roll 99 is a ratchet 102, and cooperating with the ratchet 102 is a pawl 103 carried on a lever arm 104 pivotally mounted on the shaft 101. The pawl 103 is normally biased by a spring 105 into engagement with the teeth on the ratchet wheel 102. A spring 106 normally biases the arm 104 in a clockwise direction to bring the arm 104 into normal bearing engagement with a pin 107 fixed to the printing arm 87. Thus, as the printing arm 87 is rocked in a counterclockwise direction by the spring 89, upon the de-energization of magnet 86, the pin 107 also rises with the lever 87 thereby permitting the spring 106 to rotate the lever arm 104, following the pin 107. By this action the pawl 103 is brought into engagement with the next tooth of the ratchet wheel 102 so that when the magnet 86 is again energized to rotate the lever 87 clockwise, the pin 107 urges the lever arm 104 counterclockwise about the pivot 101 to thereby cause the pawl 103 to rotate the ratchet 102, and hence the feed roll 99, one step counterclockwise to advance the tape 92 (which is pressed between a pressure roller 108 mounted on a lever 109 urged by a spring 111), to the left to bring a new printing area under the type wheel 93. The type wheel 73 has fixed rows of type and normally, when idle, no row is over the print hammer. When no negative impulses are transmitted, the type wheel does not rotate, and for word spacing the type wheel also makes no axial motion. Thus, for all printed characters one or more axial steps are made.

A lever arm 114 (Fig. 4) is also fixed to the shaft 95 and functions upon the counterclockwise rotation of shaft 95 to release the levers 76 and 77 from engagement with the teeth 79 on the bar 78, rotating the levers 76 and 77 against the action of their springs 115. Upon thus releasing the levers 76 and 77, the type wheel is permitted to return to its zero axial position, and the action of the arm 96 upon the latch 44 permits the type wheel to return to its zero angular position.

Figure 8:
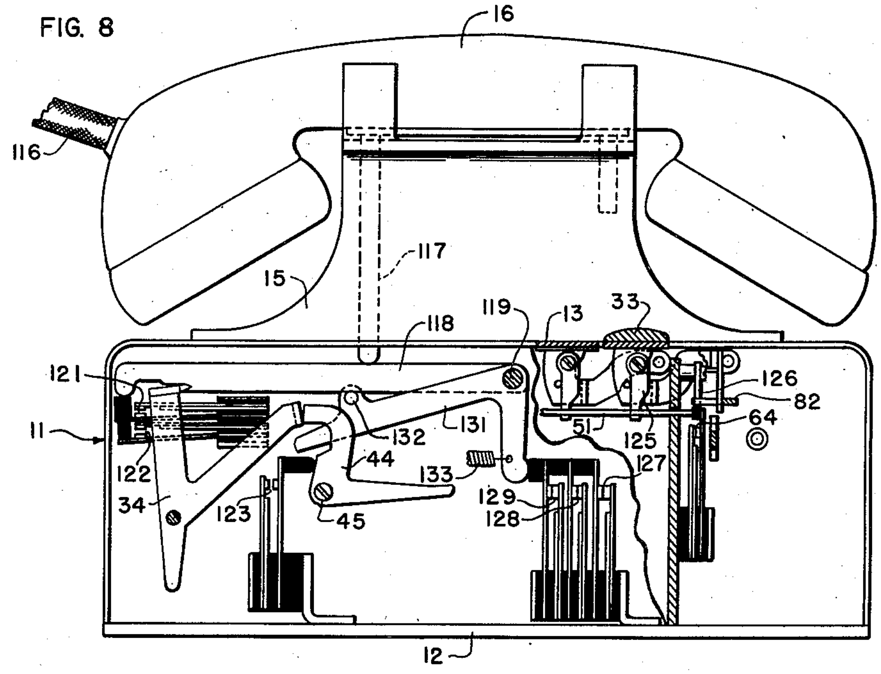
Fig. 8 is a transverse cross sectional view showing certain control contacts and the telephone table mounting.
Figure 9:
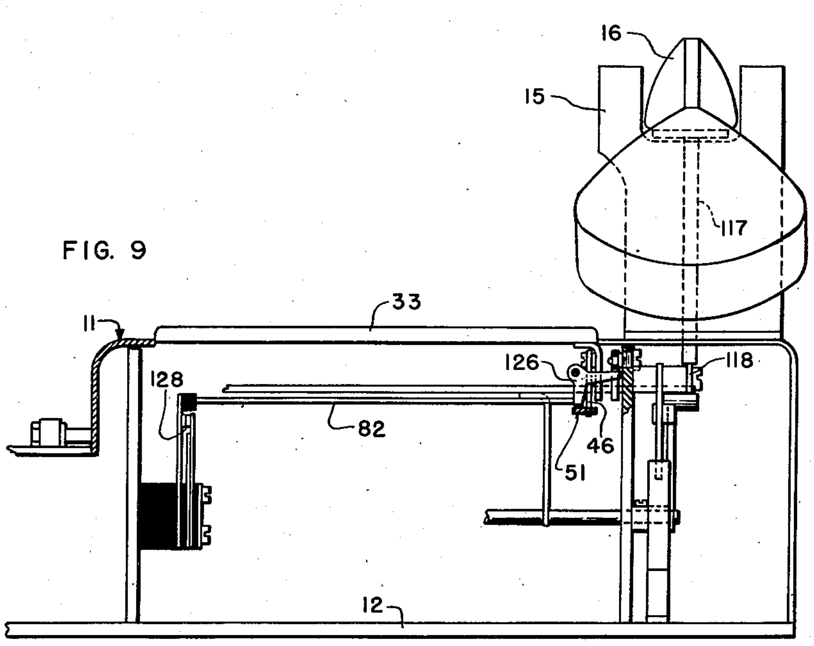
Fig. 9 is a sectional view showing the control mechanism and contacts controlling the axial motion of the type wheel.

Having reference to Figs. 8 and 9 there is shown at the rear of the unit 11 a cradle 15 adapted to receive the handset 16 of well known construction. The handset 16 is connected to a cable 116. The cradle 15 is provided with a plunger 117 which cooperates with a lever 118 to lock the keyboard. Lever 118 is pivotally mounted on a pivot shaft 119 and cooperates at its free extremity with a pair of contacts 121 and 122. The lock latch 44 operates contacts 123 suitably mounted on the base plate 12. When the space bar 33 is operated the bevel on the depending lever arm 125 acts to move the bar 51 rightwardly (as viewed in Fig. 8) to open the contact 64. Moreover, the depression of the space bar 33 through a bell crank lever 126 (Fig. 9) acts through bar 82 to open a contact 128.

The mechanism of the telegraphic parts of the subscriber's set has been described hereinbefore. Certain parts which are included in the subscriber's set, such as the call bell, induction coil and other electrical parts are not shown in the Figs. 1 to 9, but it will be understood that such parts are also mounted in the base of the unit.

Fig. 11 is a wiring diagram of a subscriber's station and of the subset, and the parts are shown diagrammatically in this view. Contacts 127, 128, and 129 are closed when the telephone headset 16 is in the cradle 15 and opens when the telephone headset 16 is removed to make a call. When a key is depressed to make a call or send a telegraph signal, these contacts are again closed.

Having reference to Fig. 8 the contacts 127, 128, and 129 are controlled by a bell crank lever 131 pivotally supported on the shaft 119. Lever 131 is provided with a stud 132 adapted to cooperate with lever arm 118. Lever 131 also cooperates with the bail member 34. Thus, when the telephone 16 is lifted from the cradle 15, the spring 133 biases the lever 131 clockwise, and through pin 132 lifts lever arm 118 to permit contacts 121 and 122 to close. Also, contacts 127, 128, and 129 are permitted to open. Thus, when a key is depressed, the bail 34 will be pivoted clockwise to, in turn, pivot the bell crank 131 counterclockwise to close contacts 127, 128, and 129. Contact 127 preferably closes ahead of the others and short circuits the telephone receiver to cut out any sound from the telegraph signals. Contacts 128 and 129 are also closed so as to prepare the circuit of the magnet 86 to receive the print or operating impulse. A relay 134 is provided with contacts 135, 136, and 137. In parallel with the winding of relay 134 is a rectifier 138. When the normal polarity of a telephone communication is on the line, the current flows through the rectifier 138 and relay 134 is not operated. When a signal is initiated at the distant subscriber's station the polarity of the battery on the near subscriber's line is reversed so that current now flows through relay 134 and not through the rectifier 138, and this relay now operates and by closing the above contacts prepares the receiver for a telegraph signal. The contacts 123 are closed when the keyboard lock latch 44 operates and they initiate the start impulse by unbalancing the line, as will appear hereinafter. This contact is operated from the latch 44 so as to assure that the key has been completely depressed and all portions of the apparatus properly prepared for the transmission of the signal. A rgeular call bell 139 is connected across the line through a condenser 141.

When the magnet 86 operates, the following contacts are operated: Contact 142 opens to restore the line balance for the remainder of the code signal. Contact 143 opens to cut out the primary telephone circuits so that it will not shunt current from a magnet 57 and 74. Contact 144 is closed and connects code magnet 57 and 74 into the circuit ready to receive the code signal. Contact 145 closes and cuts out the telephone receiver. Contacts 146 and 147 close and hold the circuit for magnet 86 in operating condition after the relay 134 has released when the primary circuit of the telephone is open.

*Call register*

In the system according to the present invention, it is essential that the call be registered at the central station. Since the telegraph signal may be transmitted at a considerably higher rate of speed than some exchange apparatus can operate, and since the telegraph signals are of a different character from the switching signals, they must be translated. The so called panel system and the cross bar system both have call registers, and call registers may be added to other systems if it is desirable to apply the arrangement according to the present invention to these particular systems. It is assumed in the following description that the panel system is employed. Telegraph apparatus suitable for the coordinate telegraph system must be added to the register as well as a translating device. After the signals have been received, translated, and stored in this condition, the remainder of the circuit may operate as usual.

Figure 14:
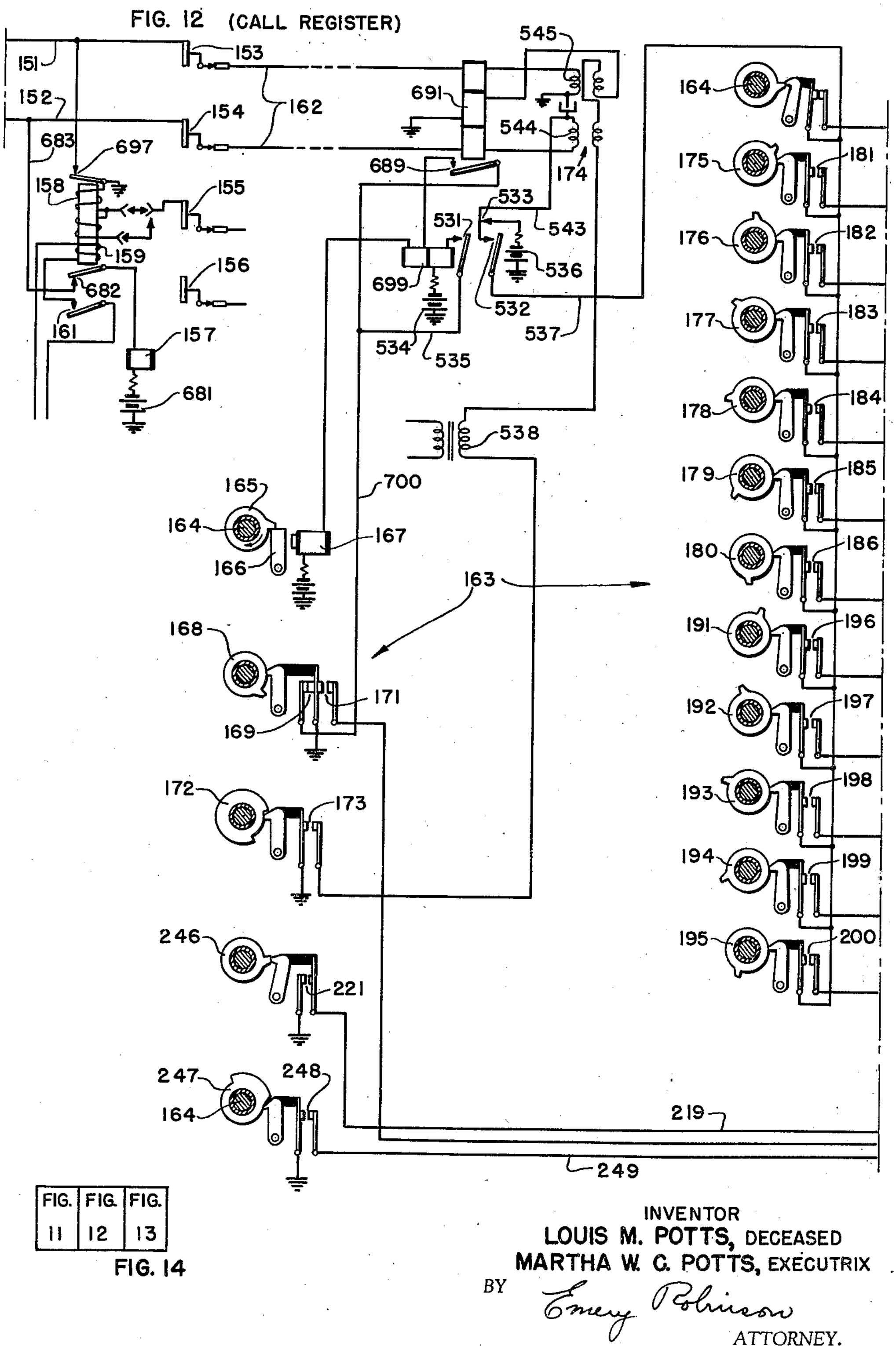
Figure 13:
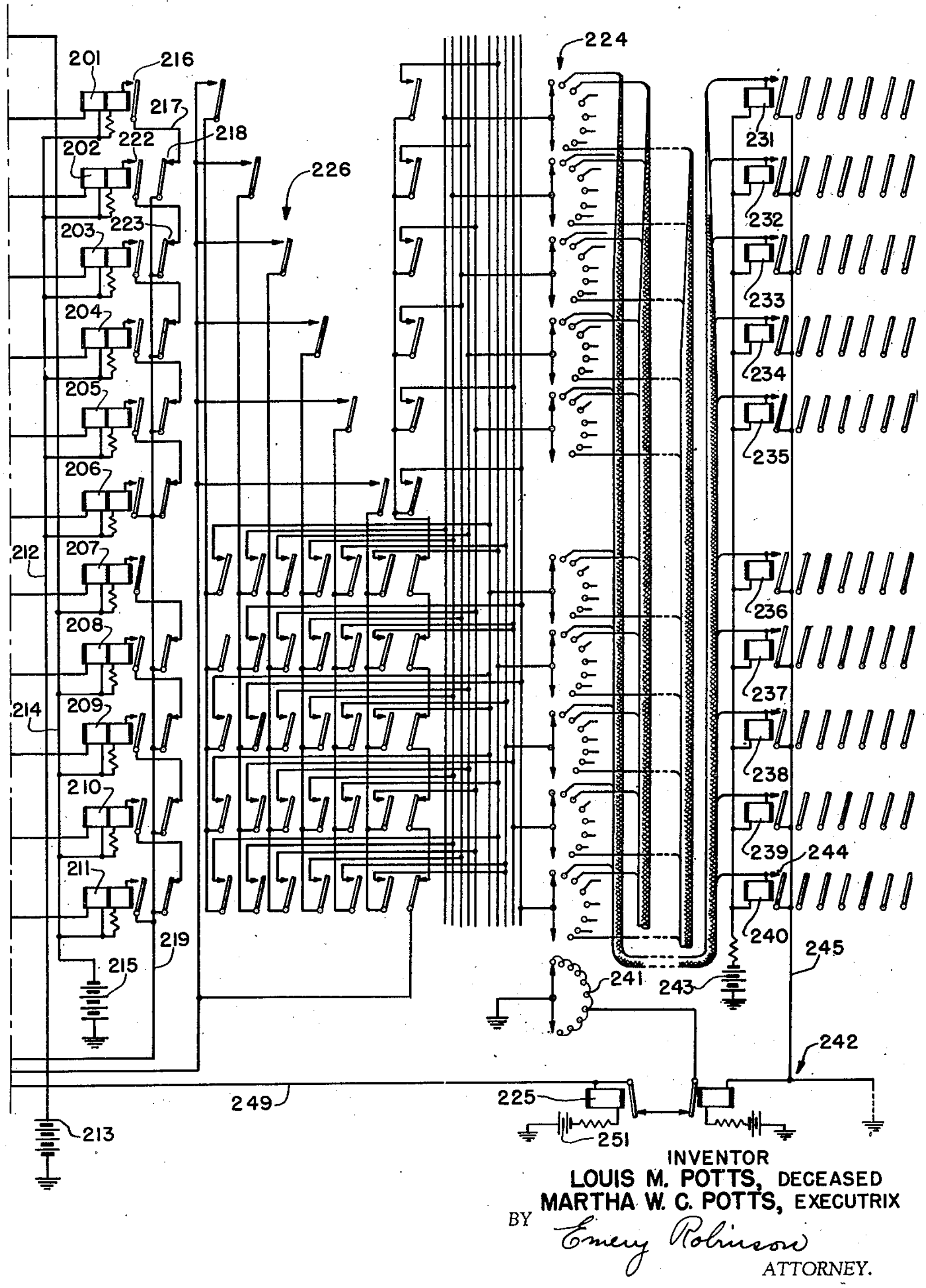

Having reference to Figs. 11, 12, and 13 (arranged as in Fig. 14), the lines 151 and 152 from the subscriber's station are connected to the terminals 153 and 154 (Fig. 12). Associated with terminals 153 and 154 are the sleeve and hunting terminals 155 and 156. There is also a line relay 157 and a cutoff relay 158 arranged as in well known central exchange offices, except that there is added to the cutoff relay 158 a winding 159 and a contact 161, used in connection with the line identifier, described hereinafter. The modified call register shown in Figs. 12 and 13 is connected through a line finder and other apparatus (not shown) and circuits 162 to lines 151 and 152 in a well known manner.

In accordance with the present invention there is added to the call register shown in Fig. 12, a transmitter indicated generally as 163, which comprises a shaft 164 carrying a plurality of cams and forming the driven member of a clutch (not shown). The driving member of the clutch is constantly rotating at a suitable speed according to the rate of signaling adopted. A stop cam 165, which is rotatable with the shaft 164, engages in the stop position thereof the tip of a lever 166 which forms the armature of a start magnet 167. A cam 168 also carried on shaft 164 operates a pair of contacts 169 and 171 to control various locking circuits. A cam 172 mounted on shaft 164 operates a contact 173 to apply alternating potential to the two sides of the loop in parallel, from a transformer 174, the primary of which is fed from a 60 cycle source for the purpose of operating the print hammer and associated parts.

A series of six cams 175 to 180, inclusive, (Fig. 12) also carried on shaft 164, operate a series of contacts 181 to 186 inclusive, respectively. Also mounted on the shaft 164 is a series of five cams 191 to 195, inclusive, which operate a series of contacts 196 to 200, inclusive, respectively. Cams 175 to 180 and 191 to 195 are so arranged that the contacts 181 of cam 175 are closed just after the shaft 164 has started its rotation in the time interval assigned to the first positive impulse followed by contacts 196, 182, 197, 183, 198, 184 (etc., alternately) at the assigned intervals. The first set of cams 175 to 180 correspond to positive impulses, and the second set of cams 191 to 195 correspond to negative impulses which are transmitted alternately, one positive, then a negative, etc. The contacts 181 to 186, inclusive, and 196 to 200, inclusive, are connected respectively to the operating winding of a series of relays 201 to 211, inclusive. The other terminals of the operating winding of relays 201 to 206, inclusive, are connected over a conductor 212 to positive battery 213. The other terminals of relays 207 to 211, inclusive, are connected over a conductor 214 to negative battery 215. These relays 201 to 211, inclusive, are provided with locking windings so connected that as each relay operates, it releases the preceding relay of the same plurality so that no more than one relay in each group may remain operated when a complete signal has been received. For example, the locking winding for relay 201 extends from battery 213, over conductor 212, through the locking winding of relay 201, through contact 216 (now closed, assuming the relay 201 to be energized) over conductor 217, through contact 218, over conductor 219, then through contact 221 (which is closed during most of the cycle of rotation of shaft 164) to ground. It will be observed that contacts 222 and 223 of relays 202 and 203, respectively, are similarly connected to the conductor 219. The operation of contact 221 will be described hereinafter.

There is also provided a step by step switch generally designated 224 (Fig. 13) which is operated in a step by step manner by a stepping magnet 225, one step between the signals for each consecutive digit of the station designation. Relays 201 to 211, inclusive, are also provided with additional contacts indicated generally as 226 so interconnected that for each setting of the relays, a circuit will be prepared to the contact brush in the switch 224 which correspond to the telephone decimal code unit represented by the telegraph code setup on the relays. Ten relays 231 to 240, inclusive, are stepped according to the translated code. Although only one set of relays 231 to 240 is shown, it will be understood that there is one such set of relays for each character in the station designation and subscriber's number, a total of seven for large districts or areas. Each of the register relays is provided with a plurality of contacts which are used for switch control as is well known in the art. An eleventh arc 241 (Fig. 13) of the switch serves to return the switch to its initial position whenever the circuit is dismissed to await another call. Circuit 242 is a holding circuit for the relays 231 to 240, inclusive, extending from battery 243, through the winding of operated ones of relays 231 to 240, inclusive, through contact 244 of said relays which have been closed, over conductor 245, then through circuit 242, to ground. Circuit 242 is a holding circuit in the call register which is grounded when the circuit is seized and disconnected from ground when the circuit is to be dismissed. Contact 221, previously described, is operated by a cam 246 which opens the contact 221 at the end of each signal after the setting of the relays 201 to 211, inclusive, have been transferred to one of the sets of relays 231 to 240, respectively. A cam 247 also secured to shaft 164 controls a contact 248 which remains closed while each signal is being received to advance the sequence switch 224 over a circuit extending from ground, through contact 248 (when closed), over conductor 249, and through the winding of stepping magnet 225 to battery 251. Thus the sequence switch 225 is advanced to connect in the correct set of storage relays (like relays 231 to 240, inclusive) for each switching signal.

Figures 17, 20:
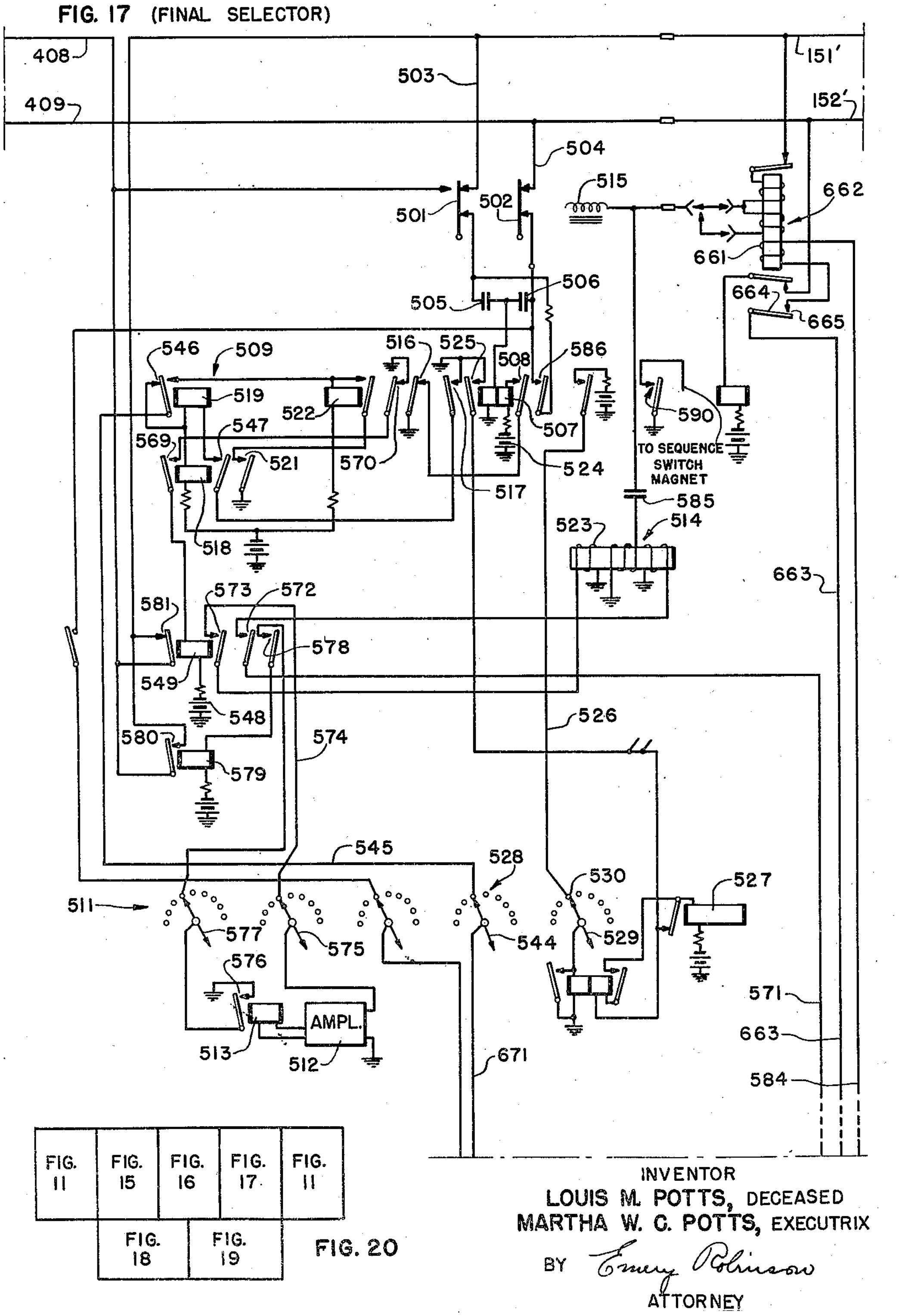
Fig. 17 is a circuit diagram of the final selector.
Fig. 20 illustrates the manner in which Figs. 11, 15, 16, 17, 18, and 19 may be placed together to show a complete communication circuit between two connected subscribers.

In response to a call, a circuit is set up comprising Figs. 11, 15, 16, 17, 18, and 19, arranged as shown in Fig. 20, and includes at least the calling station, a district selector, an incoming selector, a final selector, and a called station. These circuits are described under appropriate headings followed by descriptions of the operation for different kinds of service. Figs. 11, 15, 16, 17, 18, and 19, when placed as shown in Fig. 20, show only the part of a circuit setup for both or either telegraphic or telephonic communication which is essential for an understanding of the operation of the added telegraph apparatus, and how the combined telephonic and telegraphic service operates. Only a few of certain of the elements in the switching apparatus have been indicated, just sufficient to show how the apparatus fits in with the already existing and well known switching apparatus. It will also be understood that additional link circuits may be included. The operation will be described hereinafter after the main element of the different circuit sections have been briefly described.

In the system according to the present invention, the starting conditions in different sections of the circuit are different, and it, therefore, appears desirable to point out these differences at this point. While in the code chart in Figs. 10 and 10A the first element is called a start impulse, it is not usually a true start impulse in the same sense as in the ordinary start-stop telegraph systems.

In the case of transmitting from subscribers' stations, the grounding of the line at the subscriber's station unbalances the line and a relay at the central station operates to start the transmitting device at the central station, and at the transmitting substation there is no starting but merely the preparation or conditioning of the circuit by the operation of the printer magnet.

In the case of recording at the called subscribers' stations, the reversal of the line current serves to operate a relay in the subscriber's set, the contacts of which connect the winding of the printer magnet into the circuit so that it will receive the printing impulse and thereby connect in the code magnets of the printer. It will be noted that in this case this is rather a conditioning impulse than a start impulse. In the case of providing a home record at the calling subscriber's station, the depression of the key on the keyboard connects the print magnet in the circuit so that it is not necessary in this case to operate the conditioning relay by reversing the current on the line.

In the intermediate link circuit between the district selector and the incoming selector, when no telegraph signals are being transmitted, there is no voltage applied to the line and a receiving relay device is connected in the line at each end. When a signal is initiated in one direction the receiving relay for the other direction is removed and the transmitting contacts of the relay receiving the initiated signal are connected in place of the removed receiving relay. The signals transmitted in this loop are of the same type as conventional start-stop except that the normal no signal condition is no current. Long distance links are the same except that the signals are blocks of alternating current waves.

In the case of the identifier circuit, the line is thrown out of balance at the beginning of each identification or code signal and the operation is substantially the same as though the signal was sent from the subscriber's station. Relay 252 under control of contact of relay 253 (Fig. 16) and forming a part of the incoming selector is operated when the called party lifts the receiver from its cradle. The operation of relay

252 reverses the connection of battery 254 so that the battery on the line going to the district selector is reversed for the operation of the message register. The incoming selector may not be connected to the district selector by direct leads as indicated in the drawing but there may be inserted a trunk circuit or circuits and other switches. When the magnet 86 (Fig. 11) is energized, contact 142 is opened, thus removing the ground from the line. When the magnet 86 is de-energized after the code impulses have been transmitted, the contacts 142 are again closed, but this will do no harm since the battery is removed from the line at central. Contact 123 opens before the end of the signal interval before battery is again placed on the line at the central station.

Figure 7:
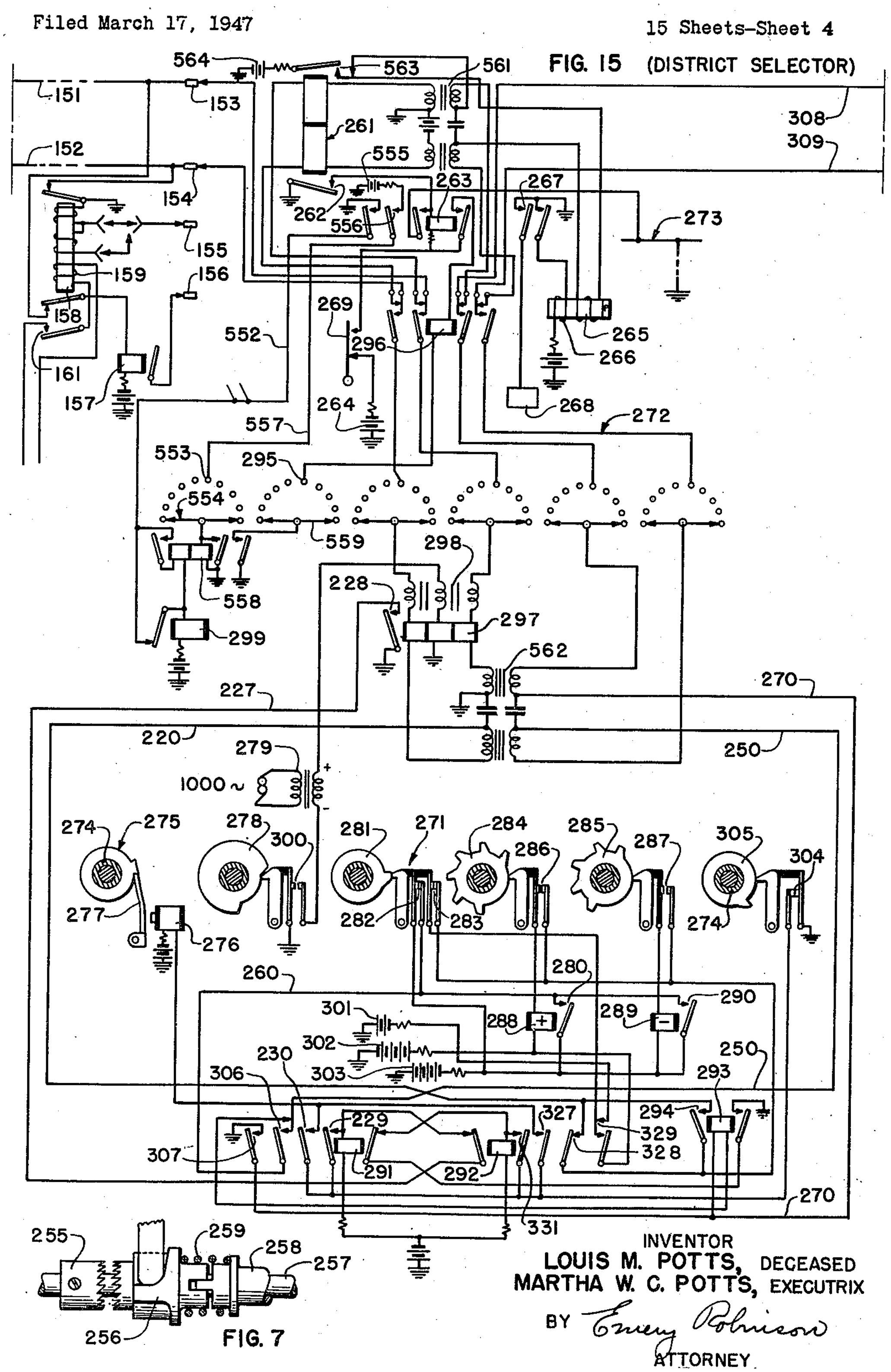
Fig. 7 is a fragmental cross section showing the transmitter clutch mechanism.

The clutches in the various repeaters and in the line identifier are preferably single revolution clutches, positive clutches with each tooth corresponding to an integral number of cycles of the driving current, and the motors are synchronous motors. Also, the motors are preferably all driven from the same source and if not, the different source should be the same frequency and have a fixed phased relation to one another. The teeth in the clutches and gearing must also be so adjusted that when the clutches are engaged to rotate the mechanism, the proper phase relations exist. In Fig. 7 there is shown such a clutch, in which a hub 255 has sixteen teeth and is constantly rotated by a motor at a predetermined speed. Member 256 is slidably mounted on a shaft 257 and is keyed to sleeve 258, under tension of spring 259 so that it may move its toothed face into engagement with the teeth in the hub portion 255, when the sleeve 258 then rotates with the shaft 257. A friction clutch and governed motor may of course be used if desired.

*District selector*

Having reference to Fig. 15, a relay 261 is connected in the line from the calling subscriber's station and is so wound and connected that when the normal telephone direct current is flowing the relay does not operate, due to the fact that the two windings are alike and have the same magnetic effect. When the line is grounded at the calling station, the relay 261 operates due to the unbalanced condition of the line. Upon operation of relay 261, its contacts 262 will operate and in turn relay 263 is operated. The operation of relay 263 connects the battery 264 to the relay 263 as explained hereinafter in connection with the description of operation. A polar relay 265 is operated when the line current is reversed due to the called subscriber lifting his telephone from its cradle. Relay 265 has an extra winding 266 which is used to hold the polar relay in its operated condition when the line is switched for telegraphic purposes.

Relay 263 is provided with a contact 267 which serves to operate a metering device 268. This may be a separate meter device for the telegraph service only, or the same meter may be operated both for telephone and telegraph service. An element 269 of the sequence device in the district selector is so arranged that a battery 264 is disconnected from relay 263 in all positions except in the ringing and talking position. This is for the purpose of preventing any false operation of the relay 263 while the circuit is being set up. In an exchange there are provided a sufficient number of repeating devices 271 suitable for repeating the telegraph signals through the district selector. The number to be provided depends on the traffic and is determined by well known methods used in providing for telephone traffic.

Associated with each of the repeaters is a finder 272 which may be connected to all of the district selectors in the office or to a certain group. Each one of the repeaters of course is connected to such a finder. It may be that all of the finders may be connected to all the district selectors in an office so that all the repeaters are available to each district selector. Different types of finders are capable of serving different numbers of circuits and a kind would be selected suitable for the particular case.

A holding lead 273 is provided in the district selector and is grounded in the usual manner until the calling party hangs up his telephone headset. This holding lead also serves to hold the telegraph repeater connected in the line until the line is dismissed by the subscriber.

The repeater 271 comprises a cam sleeve 274 driven through a single revolution clutch 275 controlled by a start magnet 276. The start magnet 276 controls an armature 277 which controls the rotation of the sleeve 274 through the cooperation of the stop disc 275. Mounted on the sleeve 274 is a cam 278 which functions to connect the output of a power transformer 279 into the circuit so as to transmit alternating current on the two sides of the line in parallel for the operation of the print hammer at the calling station. A cam 281 serves to close a contact 282 and 283 for controlling the start impulses on the two circuits. Cams 284 and 285 operate contacts 286 and 287 for the purpose of timing the duration of the positive and negative code impulses. Relays 288 and 289 are connected in the positive and negative outgoing circuits for the purpose of picking up the signals going out to the calling subscriber to repeat them to the called subscriber. One or the other of relays 291 and 292 is operated according to the direction from which the signal is initiated and serves to condition the circuit for transmission in the proper direction. Relay 293 is operated by the signals coming in from the called subscriber and its contacts 294 serve to control the transmission of positive and negative signals to the coordinate printer (shown in Figs. 1 to 4) at the calling subscriber's station, under control of the single polarity signals coming in from the called subscriber.

When the finder 272 reaches the point 295 for picking up the district selector shown in Fig. 15, relay 296 is operated. When relay 296 operates, a relay 297 is connected into the circuit and a power transformer 298 is added for the purpose of supplying the alternating current to the print magnet at the calling station. A magnet 299 is the stepping magnet for the switch 272. A battery 301 is of lower strength than 302 and is connected in during the start or idle period and serves to provide current for telephonic communication. Batteries 302 and 303 are of higher voltage than battery 301 and are suitable for operating the telegraph apparatus. When a signal is initiated by the calling subscriber, relay 297 is operated and in turn relay 291 operates and is locked to contact 304 associated with a cam 305 mounted on a sleeve 274. The operation of contacts 306 and 307 associated with relay 291 removes the winding of relay 293 from the line 308—309 and a start impulse is immediately sent on lines 308—309 to operate relay 361 (Fig. 16) in the incoming selector.

*Incoming selector*

Referring to Fig. 16, most of the apparatus and the circuit shown in this figure is substantially the same as the circuit shown in Fig. 15, except that the two sides of the repeater are reversed. Similar parts have been given the same designation as in Fig. 15 except that they are increased by one hundred. Only the features which are different will be referred to. In this case the alternating current for the operation of the print hammer, of course, is sent out to the east, whereas in the district selector this current was sent to the west for the operation of the printer at the calling station. In Fig. 16 the contact 406 is connected to positive battery 402 when a start impulse operates the relay 391, negative battery 401 is replaced by positive battery 402. The current on lines 308 and 309 is thus reversed. At the called subscriber's station (Fig. 11) relay 134 is operated and conditions print magnet 86 to receive operating current. Relay 393 corresponds to relay 293 in Fig. 16. When relay 391 is operated, the short circuit 390 is removed from the transmitting contact of relay 393. Signals can then be transmitted on lines 408 and 409 under control of contacts 321 and 322.

*Final selector*

Having reference to Fig. 17 the elements 501 and 502 are discs added on the sequence switch associated with the final selector. A ringing position is also created on this sequence switch similar to the incoming circuit. The discs are so constructed that only in the ringing position of the switch will 501 make contact with 503, and 502 will make contact with 504. When these contacts are made, the lines 408 and 409 are connected through 501 and 502 and through condensers 505 and 506, and through the winding of relay 507 to ground, so that if in ringing position the print magnet impulses are sent out on the two lines 408 and 409 in parallel, relay 507 is operated and locks in operated position to the holding circuit through contact 508. Condensers 505 and 506 are of such capacity that 60 cycle or 20 cycle ringing current will not affect relay 507 but will allow the 1000 cycle print magnet current to operate relay 507.

There is also provided a counting relay chain 509 and a sequence switch 511. The sequence switch 511 may serve a large number of final selectors and each sequence switch has associated therewith an amplifier 512 having an output relay 513. The counting relays 509 serve to connect the amplifier 512 and its output from contact of relay 513 into the circuit, only during an interval timed so that a single identification signal is picked up as will be understood from the description of operation.

There is also added to the final selector a pick-up coil 514, the middle winding of which receives the number signals individual to the connected circuits, and the right-hand coil of which receives signals from the wire carrying signals for the exchange designation. The left-hand coil picks up signals delivered by both of the other coils and delivers them to the amplifier 512 at the proper time. It is noted that there is included in the sleeve circuit an inductance coil 515 which should have considerable inductance for the 1000 cycle current but should have low resistance to direct current. It is for the purpose of shunting a larger amount of the picked up signal to the middle winding of pickup coil 514. It will also be noted that when the called party answers, the sequence switch as a result is advanced one step so that relay 507 is disconnected from the circuit and the identifier will not be called in when the party answers but only when the leave word service is desired.

When the identifier is to be dismissed, the opening of contact 516 releases the relay 507. The opening of contact 517 releases relays 518 and 519. The opening of contact 521 releases relay 522, thus completely restoring all parts to idle condition.

*Line identifier*

Having reference to Figs. 18 and 19, the line identifier includes a commutator having a solid ring 601, segmented rings 602 to 611, inclusive, corresponding to the ten digits 1 to 0, and the segmented rings 612, 613, and 614 corresponding to the letters B, U, and C for the exchange designation. Of course, it will be understood that for each exchange the different rings will vary according to the station identification or designation. There is a collecting ring 615 and a segmented ring 616 for the purpose of supplying timing impulses. The brush arm 617 is rotated continuously. It will be understood that the brush arm 617 rotates at exactly the same speed as the selector sleeve 274 (Fig. 15). For the best operation all of the parts would be driven by synchronous motors. All transmitters are preferably provided with positive tooth notches in which each tooth corresponds to an integral number of alternations of the current so that independent of the time of arrival of a start impulse within certain limits, the impulses would bear an invariable phase relation to the alternation of the current. In this manner all of the different parts of the apparatus involved in the transmission for each connection would be operating in the same phase. If part of the apparatus is in one exchange and part in another, both are preferably supplied with the same A. C. power source.

Segmented rings and rotating brushes are shown as being best adapted to a diagrammatic showing. However, commercially it is usually found preferable to use cams and contacts (as shown) in the transmitter. Each cam would have high and low parts according to the code.

When the brush arm is rotated there is continuously generated on the ten leads 620 to 629 signals corresponding to the ten digits 1 to 0. The brush arm 617 makes one revolution in sixteen elementary time intervals which is the same as the number of time intervals for one revolution of the transmitter. If the printer should be operated at a comparatively high speed, it may be desirable to increase the number of segments in this commutator, of course, still rotating the brush arm so that it passes over one segment in the same time that the said transmitter generates a unit impulse. By this means, more time would be allowed between the signals which may be desirable for operating the multiple contact switches described hereinafter.

Rotated with the brush arm 617 is a cam 631 which has a projection so located that while the brushes are passing over the idle segments it engages a lever 632 and through a pawl 633 moves a ratchet wheel 634 one-eighth of a revolution so that the cam 631 and sleeve 635 (upon which cam 631 is mounted) will make one revolution in the time assigned for the transmission of a complete station designation and subscriber's number.

Only seven intervals are required for station designation but a one-eighth interval is provided to supply extra time. Secured to sleeve 635 are three cams 636, 637, and 638. A high portion on cam 636 closes contact 639 during the first time interval. A high part on cam 637 closes contact 641 during the second time interval and a high part on cam 638 closes contact 642 during the third time interval.

It will be noted that during the first time interval assigned to the first letter of the office designation, conductor 643 will receive a signal corresponding to the letter B, during the second time interval a signal corresponding to the letter U, and during the third time interval a character corresponding to the letter C.

Also rotating with cam sleeve 635 are four cams 644, 645, 646, and 647. Movable contact members 648 each have a corresponding front contact and a corresponding rear contact. Contacts 648 each engage a notch in a push bar 649. There are one hundred sets of contacts 648, all of which are moved simultaneously by the bar 649. When the cam 644, which is the thousandths cam, is in the position corresponding to the eighth interval or idle interval, lever 651 is resting on an intermediate portion of the cam, and the bar 649 is in such a position that all of the tongues are out of contact with the front and rear contacts, as shown in the drawing. Also, during the first, second, and third intervals they remain in the same position, but during the fourth interval which corresponds to the thousandths position of the subscriber's number, a high part of cam 644 moves its bar 649 to the right and causes all of the tongues 648 to make contact with their front contacts. During the fifth interval or that corresponding to the hundredths position, contacts 648 are again in the middle or out of contact position. During the sixth and seventh position or those corresponding to the units and tens position, bar 649 is moved further to the left and all of the movable contacts 648 are connected to ground during these two time intervals. During the fourth time interval or that corresponding to thousandths when contacts 648 are moved forward, all of the groups of circuits 652 are connected to the lead 629 so that they all receive a signal corresponding to zero.

Cam 645, which is the hundredths cam, is similar to cam 644 except for its timing. Bar 653 controls one hundred switches 654. In the eighth time interval, and in the first, second, third, and fourth time intervals, bar 653 is in its middle position so that the movable contacts make contact with neither their front nor back contacts. During the fifth time interval, or that corresponding to the hundredths decimal position, all of the contacts are moved forward and, for example, in the first group of conductors 655 each of the conductors 655 is connected to a different one of the conductors 620 to 629 so that each one receives a signal corresponding to a different hundredths.

There will, therefore, be transmitted on the conductors 656 in the thousandths and hundredths position the two signals corresponding to 01, 02, 03, 04, 05, 06, 07, 08, and 09. At other time intervals these leads will be entirely disconnected from any signal source, but will during the sixth and seventh intervals corresponding to the tens and units position be connected to ground.

Cam 646 is similar to cam 644 except for its timing, and cam 646 also operates a bar 650 (similar to bar 649) which controls one hundred pairs of transfer contacts 657. There are front and back contacts just as in the case of the contacts associated with cam 644 and all of the back contacts are connected to ground. In this case during the eighth, first, second, and third time intervals, the contacts 657 are in their middle position and making contact with neither front nor back contacts. During the fourth and fifth intervals corresponding to the thousandths and hundredths position all of the contacts 657 are grounded. In the sixth interval corresponding to the tens position, contacts 657 make contact with the front contacts as in the case of the thousandths and the first group of tens contacts 657 are connected to the ten leads 620 to 629.

Cam 647 is similar to cam 646 except for the timing, and controls a corresponding bar 658 which in turn controls one hundred transfer contacts 659. In this case, during the eighth, first, second, and third intervals, the contacts 659 are in a middle position and make contact with neither their front nor their rear contacts. During the fourth and fifth intervals, corresponding to the thousandths and hundredths positions, all of the contacts are grounded. During the sixth interval corresponding to the tens position, the contacts are in their middle or idle position. During the seventh interval corresponding to the units designation, bar 658 is moved to the right and all of the front contacts are closed. In this case also, in each group of ten contacts, each contact is connected to a different one of the unit signal conductors 620 to 629.

The leads 643 and 571 pass through certain contacts later described and are connected to the right-hand winding of the pickup coil 514 (Fig. 17). It will be noted that this conductor carries a signal for the designation BUC in the first, second, and third intervals but is opened at other times. It is assumed that the called subscriber's number is Buckingham (BUC) 6200. One terminal of the winding 661 of the cutoff relay 662 associated with the line BUC 6200 is connected to the lead 663 (representing 62 of the called number). The tongue 664 of the cutoff relay 662 is connected to the lead 663, and the contact 665 is connected to the winding 661. It will be noted that by this arrangement the winding 661 will receive at the proper times in the cycle the signals for the number 6200. How these signals are passed into the link circuit and transmitted to the calling subscriber will be explained in connection with the description of the operation.

If all of the ten thousand numbers in the exchange were used, one hundred connections would be derived from each of the two hundred, or a possible ten thousand combination leads. However, only a small number would be used at one time. In the first place only a moderate percentage of the lines would call at one time and even then since the identifier is not used more than five seconds at a time only a small percentage of these would draw current at the same time so that the current drain would be small. Further, since a few micro-amperes are sufficient for the operation of the amplifier the current would in any case be small.

If it happens that the lines are classified with respect to the location of the numbers in the switchboard sections, all of the two hundred leads or conductors would not need to go to all sections of the switching apparatus. For instance, if all of the leads in one section belong to one thousand, then only the leads for this thousand would need to go to this section, that is, ninety of the leads would not go to this section so that further classification would further simplify the wiring.

In any given exchange all of the right-hand windings of relays 514 go to the same lead such as 571, but a different lead from a different signal would be required for each exchange.

Mounted on sleeve 635 is a cam 666 which closes a contact 667 in the idle step of sleeve 635. Contact 667 is in series with segment 668, over conductor 669, and serves to generate a counting impulse in each out idle step of the sleeve 635. This impulse operates the counting relays in the final selector to connect the identifier signals to lead 671 for exactly one complete signal cycle. Segment 672 serves to generate a start impulse for starting the various clutch driven units in the circuit. The primary of transformer 673 is fed from a source of one thousand volt alternating current.

*Finders*

In Figs. 15, 16, and 17, there is shown a telegraph transmitting device associated with a finder so that any one of a number of link circuits may pick up and attach itself to the repeater. For purposes of illustration a very simple step by step switch with ten points is shown. Actual switches of this type have forty points available. Line finders are available which have 200 points. In such service it is usual to have a large number of finders so connected that each finder would serve a large number of links, and a plurality of finders are available for each link. Such well known circuits are adaptable to this use by suitable modifications.

*Operation of placing a call*

No matter what kind of service is desired the operation of placing the call is precisely the same. The subscriber desiring to make a call lifts the handset 16 from the cradle and waits for the dial tone. When the dial tone is received, a circuit has been set up, as shown in Figs. 11, 12, and 13, when placed as in Fig. 14, all according to standard telephone switching methods.

Referring to Fig. 11, when the handset 16 is in the cradle 15 and the apparatus is idle, the plunger 117 and lever 118 are pressed downwardly by the weight of the handset. The bar 674 is locked so that no keys can be depressed. The contacts 121 and 122 operate just as in the standard set. The only differences in the circuit are that the connection for line 151 passes through contact 123 and the telephone receiver is shorted by contact 127. Neither of these makes any difference under these conditions. The purpose of these contacts will become apparent later.

The party desiring to make a call lifts the handset from the cradle and waits for the dial tone. When the handset is lifted, lever 118 is permitted to rise and release the keyboard for operation. The telephone transmitter and receiver are now connected for use. Lever 131 is also permitted to rotate clockwise. Contacts 128 and 129 are permitted to open and disconnect the print magnet 86 so that it will in no way interfere with the operation of the telephone apparatus. Contacts 127 are now also open so as to render the telephone receiver responsive.

When contacts 121 were closed as a result of lifting the handset a circuit was completed as follows: From negative battery 681 (Fig. 12) through the winding of line relay 157, thence through contact 682, over conductor 683, and over conductors 152 and 684 (Fig. 11), over conductor 685, through contact 143 (now closed), over conductor 686, through winding 687 of transformer 688, over conductors 689 and 691, over conductor 692, through the rectifier 138, then through contact 693 of the telephone transmitter 16, through contact 121 (now closed), over conductor 694, or conductors 695 and 696, and over conductor 151, and through contact 697 (Fig. 12) to ground. Line relay 157 operates and starts into operation the line finder of the exchange, which results in a well known manner in connecting the line to the necessary circuits registering the call. This results in a circuit as shown in Fig. 12, except that cutoff relay 158 has now been operated due to seizure of the line, and windings of relay 691 are now connected in the line. When the circuit has thus been completed by adding the call register, a dial tone is sent to the calling party who may now depress the keys of the transmitting keyboard shown in Fig. 2.

Assume that the party desires to call Buckingham 6200, finger pressure is first exerted on plate 692 (of plates 25) in such a position that pressure is also exerted on a bar 693. As plate 692 descends, the tip of depending finger 46 associated therewith would enter the path of a projection 63 on bar 52. Also, as bar 693 descends, the tip of finger 48 gets into the path of the proper projections 81 and bar 78. These fingers by their setting determine the character of the code impulses to be transmitted, as will be described hereinafter. When the code bars are depressed, bar 692 engages a universal bail 34 and rotates said bail clockwise. The bail 34 in turn engages lever 131 (Fig. 8) and thereby, after a very small amount of motion, reclosed contacts 127, which prevents any noise in the telephone receiver due to the telegraph signals to be transmitted. Contacts 128 and 129 also close and connect print magnet 86 to the line to receive the alternating current impulses transmitted from the central station over the two lines 151 and 152 in parallel, to ground. When the bars have been sufficiently depressed, bails 20 and 39 function to lock them in that position, and also lock the undepressed bars and prevent their operation until after the signal has been completed. The latch 44 rotates and retains the locking bars 20 and 39 in position. The motion of the latch 44 closes the contacts 123.

Line 151 is now connected through closed contact 123 and closed contact 142 to ground, over conductors 151, 696, and 695, through contact 123 (now closed), over conductor 698, and through contact 142 (now closed), to ground. This unbalances the current in the windings of relay 691 (Fig. 12) so that the relay 691 operates. Relay 699 now operates and locks up through contacts 169 over a circuit extending from ground, through contact 169, over conductor 700, through contact 689 of relay 691, through windings of relay 699 and magnet 167 to battery. These relays remain energized until the end of a signal. Relay 699 upon energizing closes its contacts 531 and 532. Contact 532 is part of a make-before-break contact arrangement comprising contacts 532 and 533, and upon the closure of contact 532 the contact 533 is opened successively. Relay 699 thus becomes locked up over circuit extending from battery 534, through the second winding of relay 699, through contact 531, over conductors 535 and 700, through contact 169 to ground. Negative battery 536 is now removed by the contact 533 being opened, but the line remains connected to the lead or conductor 537. However, since all contacts 181 to 186, inclusive, and 196 to 200, inclusive, are open, no direct current flows on the line at this time.

The operation of relay 691 also energizes the magnet 167, and starts the shaft 164 into operation to transmit the signal for the letter "B". As soon as shaft 164 starts to rotate, contacts 173 are closed, and alternating current is applied from the secondary of transformer 538 to transformer 174 in such a way that alternating current flows about equally into the two lines 151 and 152, through condensers 539 and 540 (Fig. 11) and through alternating current magnet 86 to ground. Magnet 86 is now energized and closes contact 145 to short circuit the telephone receiver 16, the latter circuit being obvious from the illustration shown in Fig. 11. However, this short circuiting is not necessary at this time since they are already shorted by contacts 127, but is required when receiving from the distant station since at that time contacts 127 are opened. A further operation of magnet 86 retracts the print hammer 87 and spaces the record material 92 through the spacing mechanism shown in Fig. 5. Also early in the operation of print hammer 87, contact 144 and contact 145 are closed, and positive and negative code magnets 57 and 74 are connected through positive and negative rectifiers 541 and 542 and contacts 64 and 83, respectively, across the line ready to receive direct current impulses transmitted from the central station over the sides of the loop in series. Contacts 146 and 147 perform no function at this time, but will be referred to in the description of signal reception.

Just after the shaft 164 starts to rotate, contact 221 is closed to supply locking current for relays 201 to 211, inclusive. Cam 175 closes its contact 181 at the beginning of the third time interval of the code, that is, during the first positive impulse interval, which allows ample time for contact 144 and 145 to close. Positive battery is now connected through the operating winding of relay 201 over a circuit extending from battery 213, over conductor 212, through the left-hand winding of relay 201 (Fig. 13), through the contact 181 (now closed) associated with cam 175 (Fig. 12), then over conductor 537, through contact 532 (now closed), over conductor 543, through winding 544 of transformer 174, through the lower winding of relay 691, through 162, through 154, over conductor 152, then over conductors 684 and 685 (Fig. 11), through contact 144, then through rectifier 542, winding of relay magnet 74, through contact 83, over conductor 696, over line conductor 151, through instrumentalities 153 and 162, through the upper winding of the relay 691, through winding 545 of transformer 174 to ground. Relay 201 thus operates and registers the first positive impulse.

Magnet 74 is also energized by the positive impulse, and its pawl 76 is actuated to engage the first tooth 79 on the rack 78, in readiness to advance the rack 78 once in a leftward direction (as viewed in Fig. 4). At about the time contact 181 opens to terminate the first positive impulse, contact 196 is closed by its cam 191, and negative battery 215 is now connected through the operating winding of relay 207, closed contact 196, conductor 537 and as above traced, except that as above this impulse being negative passes through the negative rectifier 541 (Fig. 11), negative magnet 57 and closed contact 64. Register relay 207 is operated and locked up over an obvious locking circuit. Magnet 57 is energized and the pawl 54 engages the first tooth 53 on the rack 52 (Fig. 2.)

When the magnet 74 was de-energized, pawl 76 advanced the rack 78 one step which in turn advanced type wheel 73 so that the first row of characters is now in the printing zone.

Just as contact 196 is opened, contact 182 is closed by its cam 176, and positive current is now again applied to magnet 74, as previously described. Relay 202 is now operated and locked but ground is removed from locking winding of relay 201 by the opening of contact 218. Two positive impulses are then registered by the operation of relay 202 and the non-operation of all other positive relays. As shaft 164 continues to rotate for this signal cycle, all positive and negative impulses are transmitted in this manner.

After the fourth positive impulse is received by magnet 74 and the bar 78 is advanced, lug 81 (Fig. 4) engages the depending lug 48 associated with the key that has been depressed or operated, and moves the bar 82 leftwardly to open the contact 83, and when the transmitter at central attempts to send a fifth positive impulse, it finds the circuit open at contact 83 and accordingly no positive impulse is sent.

The contact 64 is opened in the same manner after the third negative impulse has terminated. The type wheel of the printer will now present the type for the letter B in the printing position, and positive relay 204 and negative relay 207 will both be locked and in operating position and all of the other relays 201 to 211, inclusive, will remain unoperated for the duration of this signal cycle.

Some time after shaft 164 has started to rotate, contact 248 was closed and the magnet 225 was energized, and the stepping pawl of switch 224 was permitted to engage the next tooth in the brush stepping ratchet wheel. Some time thereafter contact 248 is opened and magnet 225 is de-energized, and the brushes of the switch 224 are advanced from the idle button of the switch and connect the ten output leads of the translator circuit to the windings of the ten decimal telephone code relays 231 to 240, inclusive, assigned to the first character of the station designation.

The closing of contact 171 transfers the translated settings of relays 201 to 211, inclusive, to relays 231 to 240, and as the shaft stops, contact 221 is opened and relays 201 to 211 are released or de-energized, ready for the next character of the call station designation.

The proper depression of the key bars 550 and 551 is now made for the letter "U." A similar sequence of operation takes place, and relays 205 and 207 are set at the end of the signal, and switch 224 is advanced one step, and the translated setting is transferred to the next set of relays corresponding to relays 231 to 240. The other keys corresponding to the remainder of the station designation are depressed, and when all have been depressed the complete called station designation is set up in three sets of relays corresponding to relays 231 to 240, inclusive.

Near the end of the revolution of shaft 164, just after the time interval has elapsed for the sixth positive impulse, contact 173 is opened, the alternating current is interrupted, and the magnet 86 (Fig. 11) is de-energized. The print hammer operates, and the letter "B" is printed at the calling station, and after the printing takes place and the paper has been spaced, all parts of the printer are released and returned to idle condition, ready to receive the next signal. The opening of contact 169 releases the relay 699 and magnet 167 to stop the shaft 164, and conditions the central station apparatus to receive the next signal.

After all the seven signals, including the station designation and the subscriber's number have been transmitted and translated to the usual telephone decimal code, the link circuit sets up a connection to the called subscriber. As soon as this has been done, the link circuit, including the coordinate transmitter and translator and all other parts are dismissed for use in receiving another call from another subscriber.

*Operation for telephone service only*

It will be assumed in this description that the subscriber has made a call as just described and desires only telephone communication. In response to the call, a connection is set up to the called subscriber. The call bell at the called station is rung in the usual manner. Upon the called party answering, a telephone communication is set up as shown in Fig. 20. Except for the few differences mentioned hereinbefore, this circuit is just like a standard telephone exchange connection and operates in precisely the same manner. None of the telegraph equipment is used during the conversation, but is merely instantly available through the few relays added to the different circuits. In the meantime, while the conversation is proceeding, all the telegraph equipment is available for the subscriber. When the conversation is finished, the headset is placed in the cradle, and the circuit is dismissed in the usual manner.

*Combined telephone and telegraph service operation*

It will be assumed that a circuit has been set up for telephone communication as described hereinbefore, and that it is desired to have telegraph communication also, either from the beginning, or after the conversation has started.

The calling subscriber depresses the space bar on his keyboard. Incidentally, the calling station will receive the called station number from the called subscriber's line identifying circuit as will be described hereinafter. The depression of the space bar rotates the lever 131 and closes all of the contacts controlled by lever 131, namely, contacts 127, 128, and 129. The closure of contact 127 short circuits the receiver 16 so that no sound will be heard therein, from telegraph signals during telephone communication. Closure of contacts 128 and 129 connects the print magnet 86 through condensers 539 and 540 to the two lines 151 and 152. When the key has been fully depressed, contact 123 is closed to place a ground on the line 151 and due to the unbalancing of the relay 261, it operates. Relay 263, in turn, operates and locks up to the holding circuit 273 so that this relay will now remain in operation until the connection is dismissed.

Operation of relay 263 connects battery 264 to one terminal of the winding of relay 296, thus preparing it for later operation. The operation of relay 263 places a ground on the start circuit 552 and magnet 299 immediately starts to step the sequence switch 272. As soon as the sequence brush 554 reaches the button 553, a circuit is completed from battery 555, through closed contact 556 of relay 263, thence over conductor 557, through button 553, over brush 554, and right-hand winding of relay 558 to ground. Magnet 299 and the left-hand winding of relay 558 are now permanently energized and the brushes come to rest. Brush 554 and button 553 are now directly grounded, so that if another finder starts, when it reaches the button corresponding to the brush 554, the corresponding relay 558 will not operate and that button will be passed by, thus denoting a busy condition so that two or more repeaters cannot be picked up by the same link circuit.

The grounded brush 559 now makes contact with the button 295 and the relay 296 now operates. The operation of relay 296 replaces the repeating coil 561 and relay 261 by a circuit including a repeating coil 562, relay 297, and relay 293. There is also included now in the west line a transformer 298 for applying alternating current to the two sides of the line 151 and 152 for the purpose of operating the print hammer 87 at the calling station. The district selector is now completely conditioned for telegraph service, by having inserted therein the telegraph repeater and the other necessary circuits.

When relay 261 was operated, contacts 563 and 262 were also operated. The closure of contact 563 places battery 564 in series with battery 254 over a circuit extending from battery 564, through contact 563, through winding of relay 265, through lower right-hand coil of repeat coil 561, through contact of relay 296, over conductor 309, through contact of relay 396 of the incoming circuit, through winding of relay 361, lower left winding of repeat coil 565, contacts of operated relay 252, through winding of relay 150 to battery 254, in the incoming selector (Fig. 16). The various parts are so arranged that the current is now increased sufficiently to operate relay 361 in the incoming selector. As a result of the operation of relay 361, a series of these events, similar to those which took place in response to the operation of relay 261 in the district selector (Fig. 15), take place. As a result of this operation, repeating coil 565 and relay 361 (Fig. 16) are removed from the circuit and there is added in their place a repeating coil 566, a transformer 567 and relays 393 and 568. The entire circuit is now conditioned for telegraph service as well as for telephone service. Telephone communication may now take place whenever keys are not depressed at either substation.

It will also be understood that if the circuit includes any additional repeating coils that similar finding devices and telegraph repeating apparatus will be added to carry the telegraph signals around the repeating coil. If the connection includes the long distance circuits over which it is not practical to transmit the direct current signals, there will be added a repeater which converts the direct current signals into modulated 1000 cycle signals so that they can be transmitted over any circuit suitable to telephone communications. Such a repeater will in addition include an amplifier. This will be more fully explained later in connection with Fig. 24.

If the calling subscriber now depresses the key corresponding to the letter "C" (for example), the operation of the apparatus at the calling station is the same as described in connection with the signals for placing a call. It therefore seems unnecessary to again tell in detail what happens at the substation.

As a result of the depression of the key to transmit the letter "C," the line is grounded through contacts 142 and 123 and relay 297 in the district selector (Fig. 15), operates over the line 151 and 152. The operation of relay 297 grounds the lead 227 and operates relay 291 over the circuit including contact 228 of relay 297. Relay 291 locks up through closed contact 229 and closed the contact 304 and so remains locked up until sleeve 274 has rotated far enough to transmit all of the code impulses. The closure of contact 230 energizes magnet 276 and starts the transmitting sleeve 274 into rotation. The operation of contact 306 removes the winding of relay 293 from the lead 250 and connects lead 250 to lead 260. As a result, battery 303 is connected through contact 282 to lead 250 which results in the operation of relay 393 in the incoming selectors (Fig. 16) as will be described hereinafter.

The operation of contact 307 placed ground on lead 270 to complete the circuit for the relay 393. As the sleeve 274 continues to rotate, contact 282 opens to terminate the start impulse. Contacts 286 and 287 alternately open and close to transmit the number of positive and negative impulses as determined by the key depressed. The contacts 280 and 290 in turn transmit over lead 250 single polarity impulses corresponding to both the positive and negative impulses transmitted over lead 220. There is transmitted over lead 220 a signal like that indicated for the letter "C" as shown on Fig. 10 and there is transmitted over lead 250 a signal for letter "C" as per Fig. 10A.

When sleeve 274 starts to rotate, contact 300 is closed and magnet 86 in the printer (Fig. 11) is energized. The print hammer is retracted and the tape is advanced one space. After sufficient time has been allowed for all the code impulses to be transmitted, contact 300 is opened and the print magnet is de-energized, and the letter "C" is recorded on the tape at the calling station.

When the start impulse is received over lines 308 and 309, relay 393 is operated, since its winding is connected across the condenser 312. The operation of relay 393 through contact 394 operates relay 391 which locks through contact 313 and 314. The closure of contact 315 energizes magnet 316 and starts the transmitting sleeve 317 into rotation. The opening of contact 390 removes the shunt from contact 318 so that contact 318 will now exclusively control the application of battery to the conductor 319, so that the signals received on line 308 and 309 will control the signals transmitted on line 408 and 409.

The operation of contact 406 removed the negative battery 401 from the conductor 319 and substituted therefor positive battery 402. The resulting reversal of current on line 308 and 309 operates relay 134 at the called station to condition the printer to receive the printing impulse. While shaft 317 continues to rotate, contacts 321 and 322 are closed in timed relation to the closure of the contacts 286 and 287 to transmit positive and negative code impulses on line 408 and 409 just like those transmitted on line 151 and 152, so that the printer at the called station operates in exactly the same manner as the one at the calling station. The transmission of a signal from the called station to the calling station is substantially the same, and will be merely described briefly. It will, of course, be assumed that the line has been conditioned by the calling subscriber since, as shown in the drawing, this cannot be done by the called subscriber.

The depression of a key at the called station operates relay 568. The operation of this relay operates relay 392 which locks up through contact 323 and contact 314. Contacts 324, 325, and 326 perform in exactly the same manner as contacts 327, 328, and 329 (Fig. 15). As a result of the operation of contact 325, a start impulse is transmitted on the line 308 and 309. The start impulse transmitted on line 308 and 309 operates the relay 293, which in turn operates relay 292. Relay 292 locks up through its contact 331 and 304 for almost the remainder of the signal. The operation of contact 329 replaces negative battery 301 by positive battery 302, which in turn operates relay 134 at the calling station (Fig. 11) and conditions the printer magnet 86 therein for energization.

The transmission of the code impulses is the same as in the reverse direction except for the different relays and contacts involved. Telegraph transmission in either direction or telephone conversation in either direction may now proceed as desired. During a conversation, telegraph service may be used at any time in either direction to merely confirm a single character or numeral if so desired, with no more interruption than the depression of a key. When the calling party replaces the telephone receiver in the cradle, both services are dismissed just as in present telephone service. The removal of ground from holding circuits 273 and 373 in addition to its normal release function, releases relay 263 and 363 so that ground is removed from finder start circuits 352 and 552, and the finders and repeaters are released for use in any other calling circuit.

Figure 21:
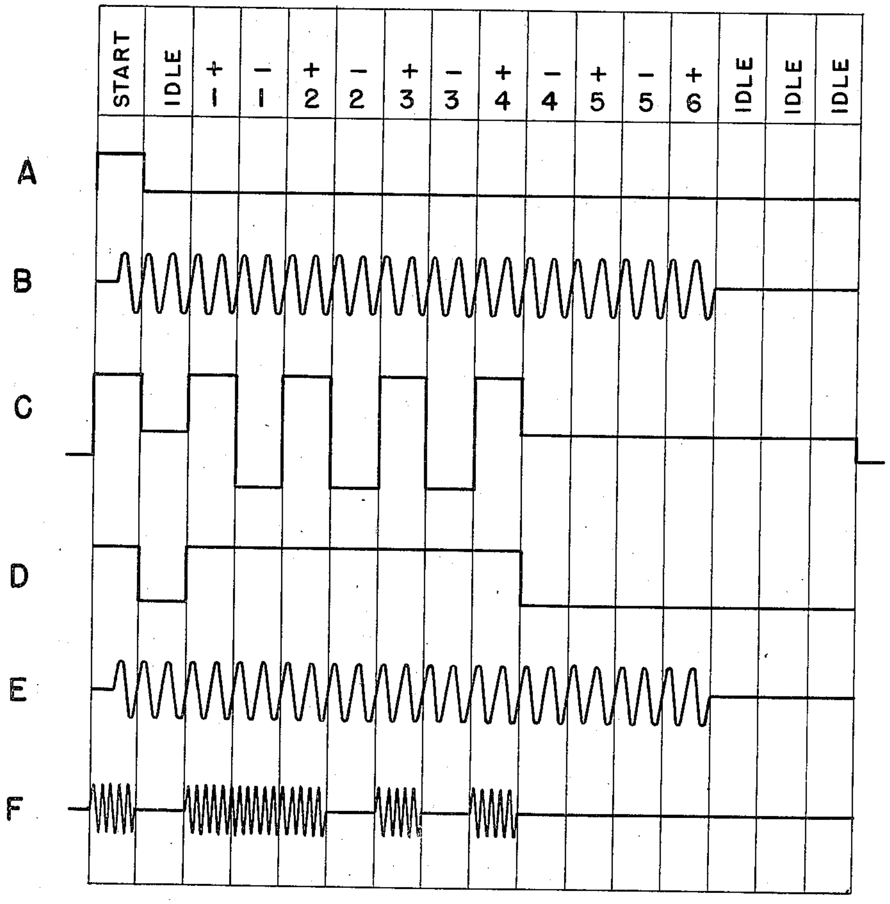
Fig. 21 shows certain signal diagrams.
Figures 22, 23:
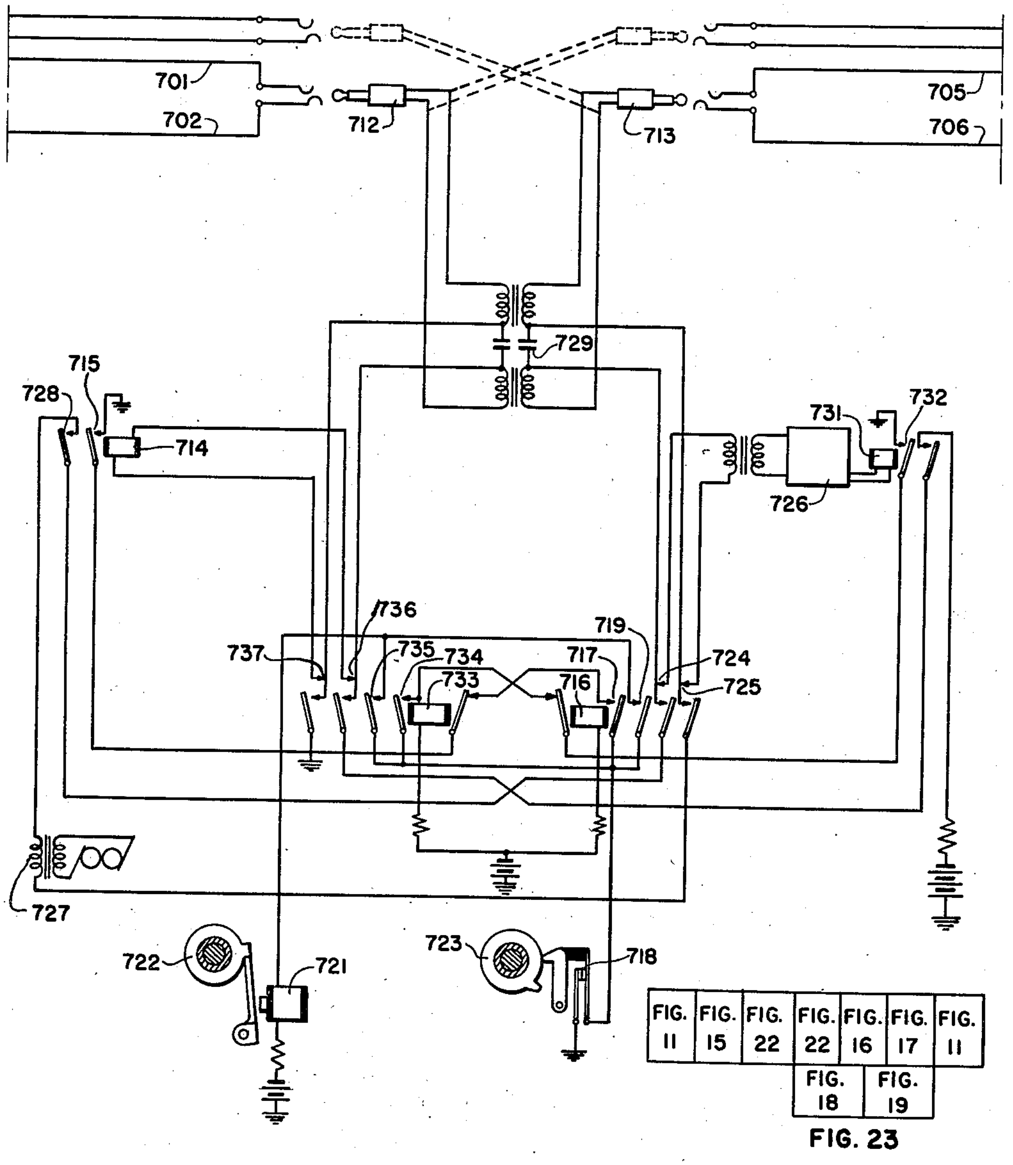
Fig. 22 shows a long distance link.
Fig. 23 illustrates how Fig. 22 may be added to the arrangement of figures shown in Fig. 20.

The signaling currents on the various circuits are best shown in Fig. 21. The first line A indicates that the line 151 and 152 is unbalanced during the start interval. Line B shows the impulse of 60 cycle current to operate the print hammer. In this diagram it is assumed that two cycles correspond to one impulse interval. Line C shows the positive and negative code impulses on line 151 and 152. Line D shows the single polarity impulses on lines 308 and 309 including the stop and code impulses. Line E shows the impulse of 60 cycle current transmitted over line 151′ and 152′ to the print hammer of the called station. Line F shows the modulated 1000 cycle impulses transmitted over lines 705 and 706 (Fig. 22). In this case 33⅓ cycles would correspond to the impulse interval. It may be preferable to change the frequency so that exact cycles will correspond with the cycle of the 60 cycle current such as 960. Fig. 21 shows the impulses in the various circuits when the signal for the letter "B" is being transmitted to the called register as shown in circuit Fig. 14.

*Leave word service operation*

It will now be assumed that the subscriber has called BUC 6200, and can get no answer, but desires to leave word. The subscriber depresses the space bar on his keyboard. This results in the connecting the repeaters in the District selector and in the incoming selector as described above. After sufficient time has elapsed for the telegraph apparatus to be connected in, the space bar is again depressed. A special tone may be provided which is connected in when the repeaters are connected if so desired, which would be very similar to tones used for such purposes in connection with other telephone connections.

The depression of the space bar at the subscriber's station will transmit a space signal, that is, a start impulse followed by no plus or minus impulses. The telegraph apparatus in the incoming selector passes these signals along in the usual manner and there is transmitted upon the lines 408 and 409 alternating current which normally operates the print magnet at the called station, but since the called station has not answered in this case and the print magnet is disconnected from the lines 151′ and 152′, the current passes through contacts 501 and 502 which are closed in the ringing position and passes through condensers 505 and 506 and relay 507. As previously explained, condensers 505 and 506 are of such capacity that the ringing current will not affect relay 507, but the 1000 cycle print magnet current will operate relay 507. Relay 507 operates and locks up from battery 524 through closed contact 508 and closed contact 516 to ground. The operation of relay 507 short circuits the line (408 and 409) thereby tripping the ringing relay in the incoming circuit advancing the incoming sequence switch to the talking position. The operation of relay 507 advances the final sequence switch through contact 590, from its newly created ringing position to the talking position. It may be understood that the newly created ringing position is identical to the talking position except that contacts 501 and 502 are disconnected from the line after the operation of relay 507. The closure of contact 525 grounds the start circuit 526 and starts stepping magnet 527 into operation to move the brushes of the finding switch 528. When brush arm 529 reaches terminal 530, the magnet 527 becomes permanently energized and the sequence switch comes to rest at this position.

When the brushes come to rest, the impulse circuit for the counting relays 509 may be traced as follows: From ground to ring 615 (Fig. 18) through the rotating brushes to segment 668, conductor 669, closed contact 667, conductor 671 to the brush 544 (Fig. 17), conductor 545 to closed contact 546 and through the winding of relay 518 to battery. Since the brush arm 617 and shaft 635 may be in any position at this time, this circuit will not be completed until the brushes 617 are on segment 668, and shaft 635 is in such a position that contact 667 is closed, that is, it must be in the idle segment not assigned to any one of the characters or numbers in the station designation. As the brush arm is moving constantly, this circuit will presently be completed and relay 518 will be operated, and as soon as the circuit is opened, relay 519 will operate and lock up through closed contact 547. It will be noted that now a circuit has been completed from battery 548, winding of relay 549, closed contact 569 to ground through closed contact 570. Relay 549 will operate. As the brush 617 and shaft 635 continue their rotation, first the letter "B" will be transmitted, then the letters "U" and "C" will be transmitted followed by the signals for the number 6200. The letters "BUC" will be transmitted over the conductor 571 through the closed contact 572 to the right-hand winding of the pickup coil 514, which in turn will be picked up by the left-hand winding and passed through closed contact 573, over conductor 574, through brush arm 575, and to the input circuit of amplifier 512. The signals will be amplified and rectified and operate relay 513 to, in turn, through contact 576 and through brush arm 577, and through closed contact 578, operate the relay 579, which through contact 580 will control signals on lines 408 and 409. It will be noted at this time that contact 581 is opened, thus permitting contact 580 to control the signals on the lines 408 and 409.

When the sleeve 635 reaches its fourth position, a circuit may be traced as follows: From ground, through the secondary of transformer 673 (Fig. 18), over collecting ring 601, through the brushes 617, through segmented rings 607, over conductor 626, through the closed front contact on tongue 582, over conductor 663 to closed contact 665, through the winding 661, over conductor 584, through the closed contact of tongue 657 to ground. This will induce current in the other winding of the cutoff relay which will be conducted through the sleeve connection, and through conductor 585 (Fig. 17) to the middle winding of the pickup coil 514. These signals will in turn be picked up by the left-hand winding of the pickup coil 514 and passed over the conductor 574 as before to the input of amplifier 512, and the signal will be delivered on the output of the amplifier over the same circuit as previously described in connection with the station designation. Similar circuits may be traced for the remainder of the signal.

When the sleeve 635 again reaches the idle position, and the brushes 617 pass over the segment 668, another impulse will be transmitted over the conductor 671 to the counting relays, and relay 522 will be operated. The opening of contact 516 releases relay 507 and dismisses the identifier making it ready for use in another circuit. When the signals are received in the office selection, the positive and negative impulses and the A. C. print impulses are transmitted to the calling station in the usual manner, and BUC 6200 is recorded on the printer. The opening of contact 586 removes the short circuit on lines 408 and 409 and returns control to the substation. The opening of contact 517 releases relay 518 and relay 519, and the opening of contact 521 releases relay 522, and all parts are now released. The calling station is now in a position to communicate with an unattended subscriber set and leave a printed record of his message.

*Long distance link circuit*

Fig. 24 shows a repeater for converting direct current signals into modulated 1000 cycle current for transmission over long distance lines, and also for converting the 1000 cycle signal into direct current signals. Fig. 25 illustrates how the various figures may be put together to include a long distance link between the district selector and the incoming selector. The conductors 308 and 309 of the district selector in the embodiment of the invention being described will be connected to conductors 701 and 702 of Fig. 24, and the outgoing conductors 705 and 706 of this repeater will connect to a second set of conductors 701 and 702 as per Fig. 24, and the outgoing of these 905 and 906 of the second repeater will connect to the leads 308 and 309 of the incoming selector. In the first-mentioned case, the plugs 712 and 713 will be connected according to the full line shown in Fig. 24, while in the second case, the plugs 712 and 713 will be inverted as shown by the dotted lines.

A start impulse arriving over lines 701 and 702 will operate relay 714 over an obvious circuit, and the closure of contact 715 will operate the relay 716. Relay 716 will be locked up through its contact 717 to holding contact 718 for the period occupied by the transmission of the code impulses of one signal. The operation of contact 719 will energize the magnet 721 and start transmitting sleeve 722 into rotation. Sleeve 722 carries only the cam 723 which functions to open the contact 718 after the code impulses have been transmitted. This mechanism could be replaced by a slow-to-release relay if one of sufficient accuracy is used, or any other means of holding a contact for the correct length of time after it has been operated will suffice.

Contact 724 and contact 725 when operated disconnect the input of amplifier 726 from lines 705 and 706 and connect the output of transformer 727 as controlled by the transmitting contact 728 of relay 714 across the condenser 729, so that as the incoming signals operate the relay 714, contact 728 repeats similar signals on lines 701 and 702 like those shown in Fig. 23. The signals being transmitted over lines 705 and 706 pass through the input wires 701′ and 702′ and enter the repeater on the second sheet like Fig. 24, by way of plugs indicated by the dotted lines. The start impulse then goes through amplifier 726′ and relay 731′ becomes energized in response to the start impulse. The closure of contact 732 operates the relay 733. The closure of contact 734 locks the relay 733 through contact 718 from the time during which the code impulses are to be transmitted. The operation of contact 735 energizes the magnet 721 and starts the sleeve 722 into operation to control the opening of contact 718 at the end of the signal. Contact 736 and contact 737 operate to disconnect the input of amplifier 726 from the circuit of lines 701 and 702 and substitute therefor the transmitting contact 728 operated according to the signals coming in on the lines 701 and 702.

If a circuit using such a long distance link is provided, the leave word service is available in the usual manner. If the called party answers at once, or after the message has been started both services are then available. With this service, all calls can be completed, whether the party answers or not.

*Coordinate printer call register*

In the present telephone call register, nine of the dial signals correspond to letters, while in the coordinate printer a separate signal is available for each of the twenty-six letters. If two letters are used for the station designation, the dial system gives a maximum of eighty-one exchanges. If the coordinate printer is used in place of the dial and the call register is modified to give a separate registration for each character, two letters will give a possible 676 stations. With three letters, the dial system gives a maximum of 729 exchanges, and the coordinate system 16,526 or a ratio of roughly 1 to 8 and 1 to 22. This might be important on a national exchange system. Of course, these figures are greatly reduced if the letters are the initial letters of a name, because many sequences of letters are not usable in this manner.

Although a specific embodiment of the invention has been disclosed it is contemplated that the invention covers all possible variations which come within the scope and equivalency of the appended claims.

What is claimed is:

1. In a communication system, a plurality of substations, switching apparatus, circuits forming a part of the switching apparatus, means to connect any two substations through the switching apparatus, circuits forming part of the switching apparatus but individually associated with each substation, an identifying signal master generator; means to associate the master generator differently with each individual circuit, and inductive means effective when individual circuits are connected to the link circuit to transfer the identifying signal to the link circuit.

2. In an exchange system, a plurality of substations, switching apparatus to connect any calling station to any other station, means to signal the called station after a connection has been established, a line identifier associated with the switching apparatus, a source of alternating current associated with said line identifier, an alternating current responsive relay associated through said line identifier with said source, means to connect said relay to the called line at the switching station only while the subscriber is being signalled, and means controlled by said relay to connect the line identifier into the signal line to send signals identifying the connected substation.

3. In a communication system, means for transmitting signals in accordance with a coordinate telegraph code, a switching system controllable by decimal step-by-step impulses, a call register, means in said cell register responsive to said code signals, said means comprising a first series of cam operated contacts assigned to positive impulses, a second series of cam operated contacts assigned to negative impulses, the contacts of said first and second series operable alternately, storage relays associated individually with said contacts, said relays provided with locking windings so connected that as each relay operates it releases the preceding relay of the same series so that only one relay in each series remains operated when a complete signal is received, and means in said call register comprising a plurality of step-by-step switches to translate the coordinate telegraph code signals into decimal step-by-step code suitable for the operation of the switching system.

4. In an exchange system, a plurality of substations, switching apparatus to connect any calling station to any other station, means to signal the called station after a connection has been established, a line identifier associated with the switching apparatus, a source of alternating current associated with said line identifier, an alternating current responsive relay associated through said line identifier with said source, means to connect said relay to the called line at the switching station only while the subscriber is being signalled, and means controlled by said relay comprising a pick-up coil to connect in the line identifier, whereby signals identifying the connected substation are transmitted.

5. In a communication system, means for transmitting signals in accordance with a coordinate telegraph code, a switching system controllable by decimal step-by-step impulses, a call register, means in said call register responsive to said code signals, said means comprising a first series of cam operated contacts and a second series of cam operated contacts, the contacts of said first and second series operable alternately, storage relays associated individually with said contacts, and means in said call register comprising a plurality of step-by-step switches to translate the coordinate telegraph code signals into decimal step-by-step code suitable for the operation of the switching system.

6. In an exchange system, a plurality of substations, switching apparatus to connect any calling station to any other station, means to signal the called station after a connection has been established, a line identifier associated with the switching apparatus, a source of alternating current associated with said line identifier, an alternating current responsive relay associated through said line identifier with said source, means to connect said relay to the called line at the switching station only while the subscriber is being signalled, a pick-up coil having a plurality of windings, one of said windings governed by certain signals from said line identifier indirectly through said alternating current responsive relay and another of said windings governed by other signals directly from said line identifier, and means effective through said alternating current responsive relay and said pick-up coil to connect the line identifier into the signal line to send signals identifying the connected substation.

7. In a communication system, a plurality of substations, a keyboard signal controlling device at each substation, a switching station, a line circuit comprising a pair of wires leading from each substation to said switching station, telegraph repeating apparatus at the switching station responsive to the operation of said device to connect the calling station to any other one of said substations, means to signal the called station after a connection has been established, line identifying apparatus at the switching station for identifying the called station to the calling station, a sequence switch at said switching station, amplifying means controlled by said sequence switch, a counting relay chain at said switching station effective to connect said amplifying means into said line circuit only during an interval timed so that a single identification signal is picked up, and means at the switching station effective in response to a signal transmitted upon the operation of a certain key on said keyboard when the called party fails to answer for picking up signals from said line identifying apparatus and transferring said signals through said sequence switch to said amplifying means, whereby said signals are transmitted to the line circuit under the control of said counting relay chain before telegraph communication is effected between the calling and called party.

MARTHA W. E. POTTS.

*Executrix Under the Last Will and Testament of Louis M. Potts, Deceased.*

REFERENCES CITED

The following references are of record in the file of this patent:

UNITED STATES PATENTS

| Number | Name | Date |
|---|---|---|
| 1,465,299 | Espenschied | Aug. 21, 1923 |
| 1,936,900 | Bugge | Nov. 28, 1933 |
| 2,053,749 | Steenack | Sept. 8, 1936 |
| 2,152,772 | Potts | Apr. 4, 1939 |
| 2,230,081 | McCann | Jan. 28, 1941 |
| 2,300,775 | Cole | Nov. 3, 1942 |
| 2,306,701 | Keinkead et al. | Dec. 29, 1942 |
| 2,349,129 | Albert | May 16, 1944 |
| 2,350,146 | Borgeson | May 30, 1944 |
| 2,360,719 | Reisz | Oct. 17, 1944 |
| 2,364,771 | Bascom et al. | Dec. 12, 1944 |
| 2,444,078 | Weaver | June 29, 1948 |
| 2,464,371 | Blyholder | Mar. 15, 1949 |

FOREIGN PATENTS

| Number | Country | Date |
|---|---|---|
| 197,503 | Great Britain | May 17, 1923 |